Figure 1:
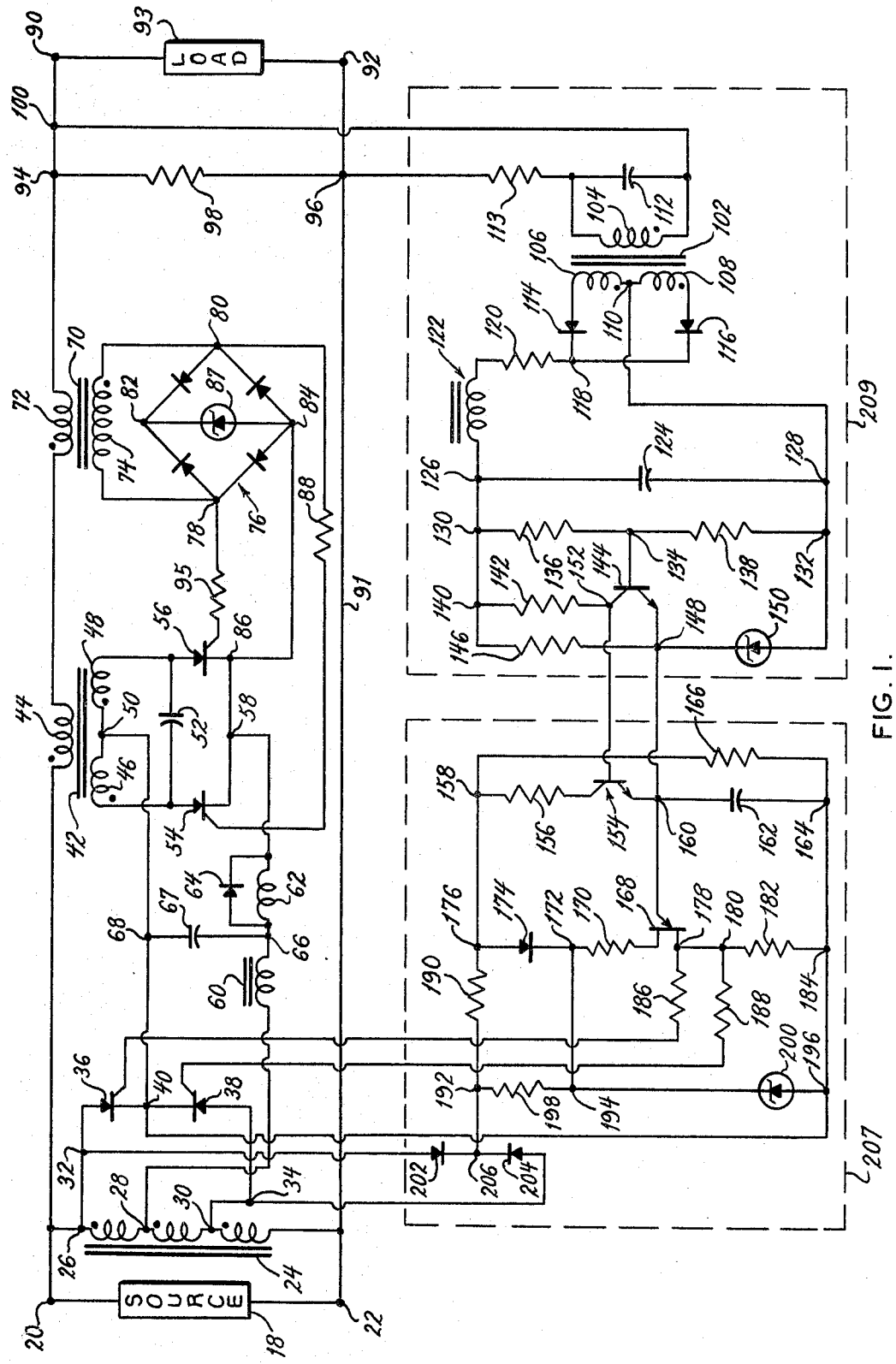

Oct. 25, 1966     O. E. REINERT     3,281,654

A.C. VOLTAGE REGULATING SYSTEMS

Filed Oct. 9, 1963     3 Sheets-Sheet 1

Oct. 25, 1966   O. E. REINERT   3,281,654
A.C. VOLTAGE REGULATING SYSTEMS
Filed Oct. 9, 1963   3 Sheets-Sheet 2

United States Patent Office 3,281,654
Patented Oct. 25, 1966

3,281,654
A.C. VOLTAGE REGULATING SYSTEMS
Owen E. Reinert, St. Louis County, Mo., assignor to Sperry Rand Corporation, New York, N.Y., a corporation of Delaware
Filed Oct. 9, 1963, Ser. No. 315,005
31 Claims. (Cl. 323—45)

This invention relates to improvements in A.C. voltage regulating systems. More particularly, this invention relates to improvements in control systems which can be connected to sources of alternating current and which can regulate the A.C. voltages which those sources supply to loads.

It is, therefore, an object of the present invention to provide a control system which can be connected to a source of alternating current and which can regulate the A.C. voltage which that source supplies to a load.

The control system provided by the present invention has input terminals which can be connected to a source of alternating current and has output terminals which can be connected to a load; and that control system will regulate the A.C. voltage which that source supplies to that load. Specifically, that control system will sense incipient changes in the A.C. voltage which the source of alternating current supplies to the load; and it will respond to those changes to develop A.C. voltages and will superimpose those voltages on the A.C. voltage supplied to the load by the source to maintain the latter voltage substantially constant. If an incipient change tends to reduce the A.C. voltage that is being supplied to the load by the source of alternating current, the control system will respond to that change to develop an A.C. voltage and will superimpose that voltage on the A.C. voltage supplied by the source; and that superimposed voltage will aid the voltage supplied by the source and will thereby keep the voltage supplied to the load at the desired level. If an incipient change tends to increase the A.C. voltage that is being supplied to the load by the source of alternating current, the control system will respond to that change to develop an A.C. voltage and will superimpose that voltage on the A.C. voltage supplied by the source; and that superimposed voltage will buck the voltage supplied by the source and will thereby keep the voltage supplied to the load at the desired level. In this way, the control system of the present invention will hold the voltage, supplied to the load, substantially constant even if the voltage supplied by the source of alternating current decreases or increases. It is, therefore, an object of the present invention to provide a control system which can respond to incipient changes in the A.C. voltage, supplied to a load by a source of alternating current, to develop an aiding or bucking A.C. voltage and to superimpose that voltage upon the A.C. voltage supplied to the load by the said source to maintain the A.C. voltage supplied to the load substantially constant.

The control system of the present invention permits the source of alternating current to supply its voltage substantially directly to the load, and that control system merely superimposes a corrective voltage on that voltage. This is desirable because it frees most of the components of the control system from all need of withstanding the rated voltage and the rated current of the load. As a result, those components can be relatively small and relatively inexpensive. It is, therefore, an object of the present invention to provide a control system which permits a source of alternating current to supply its voltage substantially directly to the load and that merely superimposes a corrective voltage on that voltage.

The control system provided by the present invention utilizes static components; and it thus is free from all problems due to sticking contacts. Also, that control system will be free from all problems due to mechanical inertia. As a result, the control system provided by the present invention is virtually trouble-free and is extremely rapid in action. It is, therefore, an object of the present invention to provide a control system which can regulate the A.C. voltage that a source of alternating current supplies to a load and which utilizes static components.

The control system provided by the present invention has a low ratio of harmonic voltages to corrective voltages. This is desirable because it minimizes the need of filtering the current that is supplied to the load.

The control system provided by the present invention utilizes electronic switch-type components, and those components enable that control system to have a high efficiency. Also, those components enable the control system to act so rapidly that the voltage supplied to the load can not drift appreciably from the desired value. It is, therefore, an object of the present invention to provide a control system which utilizes electronic switch-type components.

Other and further objects and advantages of the present invention should become apparent from an examination of the drawing and accompanying description.

In the drawing and accompanying description, several preferred forms of the present invention are shown and described, but it is to be understood that the drawing and accompanying description are for the purpose of illustration only and do not limit the invention and that the invention will be defined by the appended claims.

Figure 3B:
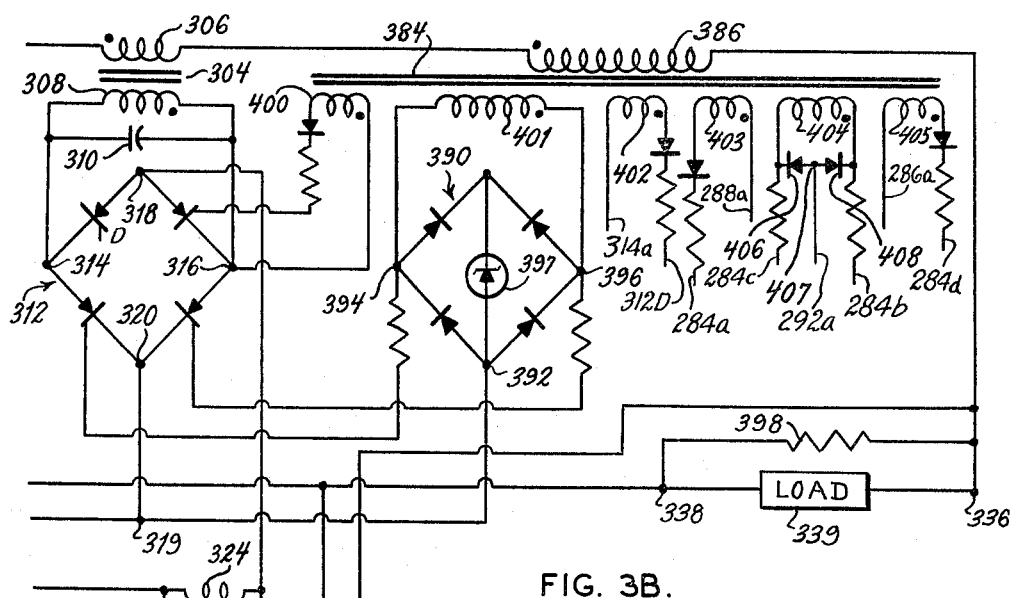
Figure 4:
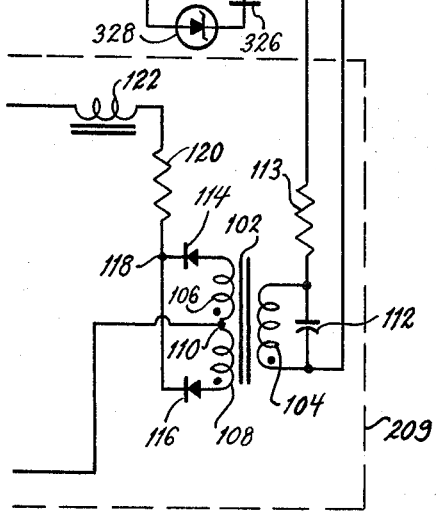
Figure 4:
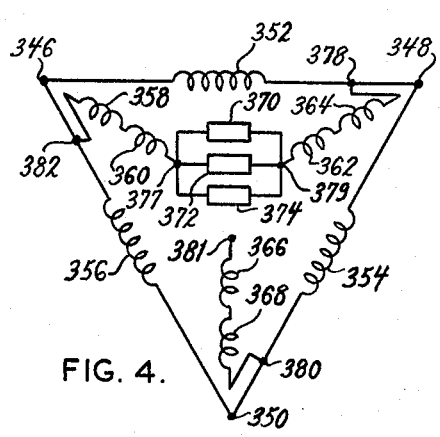
Figure 2:
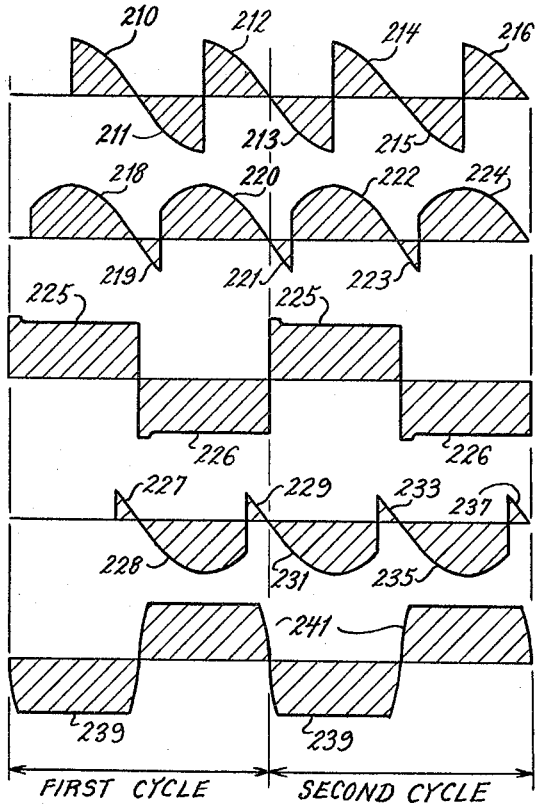
Figure 3A:
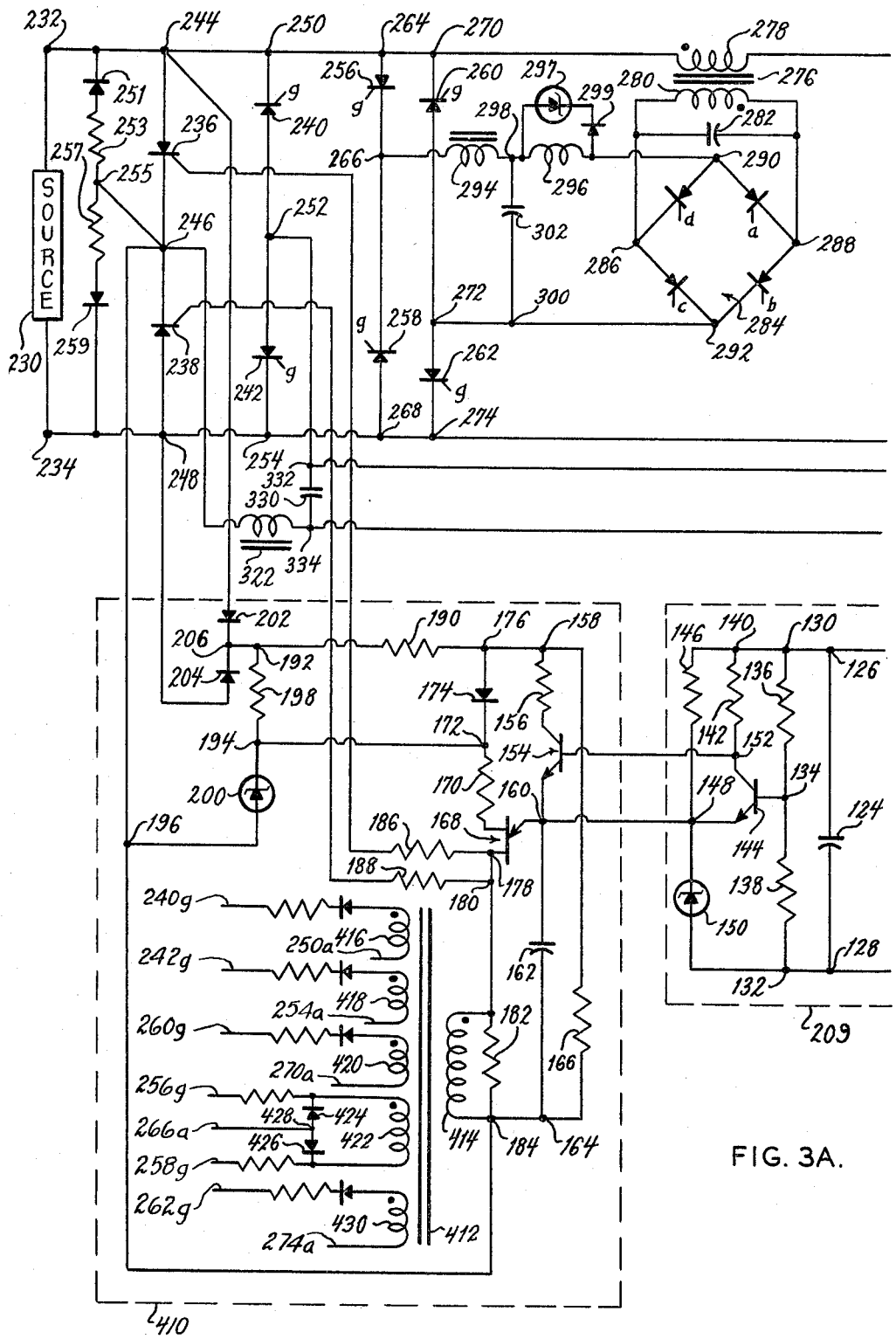

In the drawing, FIG. 1 is a schematic diagram of one preferred form of control system that is made in accordance with the principles and teachings of the present invention, FIG. 2 is a view showing wave forms developed by the control system of FIG. 1, FIG. 3 is a two-sheet diagram of another preferred form of control system that is made in accordance with the principles and teachings of the present invention, and FIG. 4 is a schematic diagram of a three-phase control system that is made in accordance with the principles and teachings of the present invention.

Referring to FIG. 1 in detail, the numerals 20 and 22 denote the input terminals of an A.C. line voltage regulator that is made in accordance with the principles and teachings of the present invention. Those terminals are connectable to a suitable source 18 of single-phase sinusoidal alternating current. An autotransformer 24 has the upper and lower terminals thereof connected to the terminals 20 and 22; and that autotransformer has a tap 26, a tap 28, and a tap 30. The tap 26 of autotransformer 24 is connected to the anode of a controlled rectifier 36 by a junction 32; and the tap 30 of that autotransformer is connected to the anode of a controlled rectifier 38 by a junction 34. The cathodes of those controlled rectifiers are connected together by a junction 40. The controlled rectifiers 36 and 38 preferably are silicon controlled rectifiers.

A transformer 42 has one terminal of the primary winding 44 thereof connected to the terminal 20 and has the other terminal of that primary winding connected to one terminal of the primary winding 72 of a transformer 70. The other terminal of the primary winding 72 is connected to output terminal 90 of the A.C. line voltage regulator by junctions 94 and 100. A conductor 91 and a junction 96 connect the terminal 22 with output terminal 92; and a load 93 is connected to the output terminals 90 and 92. That load can be resistive, inductive or capacitive in nature and can have any power factor.

The transformer 42 has a secondary winding 46 and a secondary winding 48; and the adjacent terminals of those secondary windings are connected by a junction 50. The outer terminals of the secondary windings 46 and 48 are connected by a capacitor 52. The outer terminal of the secondary winding 46 also is connected to the anode of a controlled rectifier 54; and the outer terminal of the secondary winding 48 also is connected to the anode of a controlled rectifier 56. The cathodes of those controlled rectifiers are connected together by junctions 58 and 86. Those controlled rectifiers are preferably silicon controlled rectifiers. An inductor 60 and a junction 66 connect the tap 28 of autotransformer 24 to the lower terminal of a capacitor 67; and a junction 68 connects the upper terminal of that capacitor to the junction 40. An inductor 62 and the junction 66 connect the junction 58 to the lower terminal of the capacitor 67; and the junction 68 connects the upper terminal of that capacitor to the junction 50. A diode 64 is connected in parallel with the inductor 62; and the anode of that diode confronts the junction 66.

In one preferred embodiment of the A.C. line voltage regulator of FIG. 1, the inductor 60 is a swinging choke which has an inductance of about fifty millihenries at one ampere and about three-quarters of a millihenry at twenty-four amperes. The inductor 62 can be an air core inductor; but it should have enough inductance to enable it to coact with the capacitor 52 to effect commutation of the controlled rectifiers 54 and 56.

The numeral 74 denotes the secondary winding of the transformer 70; and the terminals of that secondary winding are connected to the input terminals 78 and 80 of a full wave bridge rectifier 76. The output terminals of that bridge rectifier are denoted by the numerals 82 and 84; and a Zener diode 87 is connected between those output terminals. The anode of that Zener diode is connected to the output terminal 84, and the cathode of that Zener diode is connected to the output terminal 82. The output terminal 84 is connected to the cathode of the controlled rectifier 56 by the junction 86, and is connected to the cathode of the controlled rectifier 54 by the junctions 86 and 58. The gate of the controlled rectifier 56 is connected to the input terminal 78 of the bridge rectifier 76 by a resistor 95; and the gate of the controlled rectifier 54 is connected to the input terminal 80 of that bridge rectifier by a resistor 88. The transformer 70 and the bridge rectifier 76 supply firing signals for the controlled rectifiers 54 and 56.

A resistor 98 is connected between the junctions 94 and 96, and is thus connected in parallel with the load 93. Also connected in parallel with the load 93 are serially connected resistor 113 and the primary winding 104 of a transformer 102; and a capacitor 112 is connected in parallel with that primary winding. The inductance of the primary winding 104 and the capacitance of the capacitor 112 are selected to enable that primary winding and that capacitor to resonate at the frequency of the alternating current supplied by the source 18. This is desirable because it will enable that primary winding and that capacitor to attenuate any harmonics or transients that are applied to that primary winding. The transformer 102 has two secondary windings 106 and 108; and the adjacent terminals of those secondary windings are connected together by a junction 110. The outer terminal of the secondary winding 106 is connected to the anode of a diode 114; and the outer terminal of the secondary winding 108 is connected to the anode of a diode 116. The cathodes of those diodes are connected together by a junction 118.

The numeral 144 denotes an NPN transistor; and that transistor has the collector thereof connected to the junction 118 by a junction 152, a resistor 142, junctions 140, 130 and 126, an inductor 122 and a resistor 120. The emitter of the transistor 144 is connected to the junction 110 by a junction 148, a Zener diode 150, and junctions 132 and 128. The confronting terminals of a resistor 136 and a resistor 138 are connected together and are connected to the base of the transistor 144 by a junction 134. The upper terminal of resistor 136 is connected to junction 130, and the lower terminal of resistor 138 is connected to junction 132; and those resistors constitute a voltage divider which will provide a voltage at the base of the transistor 144. A capacitor 124 is connected to the junctions 126 and 128; and that capacitor will coact with the inductor 122 to smooth out and filter the output of secondary windings 106 and 108 and diodes 114 and 116. A resistor 146 is connected between the junction 140 and the junction 148. The transformer 102, capacitor 112, resistor 113, diodes 114 and 116, resistor 120, inductor 122, capacitor 124, transistor 144, Zener diode 150, and resistors 136, 138, 142 and 146 constitute a voltage sensing subcircuit; and that subcircuit is enclosed by a dashed line and is denoted by the numeral 209.

The numeral 154 denotes an NPN transistor which has the collector thereof connected to a junction 206 by a resistor 156, junctions 158 and 176, a resistor 190, and a junction 192; and the junction 206 is connected to the tap 26 of autotransformer 24 by a diode 202 and junction 32, and is connected to the tap 30 of that autotransformer by a diode 204 and junction 34. The emitter of transistor 154 is connected to junction 40 by a junction 160, a capacitor 162, and junctions 164, 184 and 196. The base of transistor 154 is directly connected to the collector of transistor 144 by the junction 152. The emitter of transistor 154 also is directly connected to the Zener diode 150 by the junctions 160 and 148. A resistor 166 is connected between the junctions 158 and 164.

The numeral 168 denotes a unijunction transistor; and the emitter of that unijunction transistor is directly connected to the upper terminal of capacitor 162 by the junction 160. Base two of that unijunction transistor is connected to the junction 176 by a resistor 170, a junction 172, and a diode 174; and base one of that unijunction transistor is connected to the junction 184 by junctions 178 and 180 and a resistor 182. The junction 178 and a resistor 186 connect base one of unijunction transistor 168 to the gate of controlled rectifier 36; and junctions 178 and 180 and a resistor 188 connect base one of that unijunction transistor to the gate of controlled rectifier 38. A resistor 198, a junction 194, and a Zener diode 200 are connected in series between the junctions 192 and 196. The transistor 154, the unijunction transistor 168, the capacitor 162, the Zener diode 200, the diodes 174, 202 and 204, and the resistors 156, 166, 170, 182, 186, 188, 190 and 198 constitute a subcircuit which can supply firing signals to the controlled rectifiers 36 and 38. That subcircuit is enclosed by a dashed line and is denoted by the numeral 207. The conductor 91 and junction 96 directly connect the input terminal 22 to the output terminal 92, and thus directly connect one terminal of the source 18 of alternating current to one terminal of the load 93. The primary windings 44 and 72 and the junctions 94 and 100 connect the input terminal 20 with the output terminal 90, and thus connect the other terminal of the source 18 of alternating current with the other terminal of the load 93. The primary winding 72 will have such a small impedance that it cannot appreciably affect the voltage which the source 18 will supply to the load 93. The primary winding 44 can, however, have a substantial voltage developed across it; and that voltage can materially affect the voltage which source 18 will supply to load 93. Where the voltage supplied by the source 18 tends to exceed the desired value, a voltage will be developed across primary winding 44 which will buck that voltage; and where the voltage supplied by the source 18 tends to fall below the desired value, a voltage will be developed across primary winding 44 which will aid that voltage.

If, at the moment the terminals 20 and 22 are connected to the source 18, terminal 20 is positive relative to terminal 22, current will flow from terminal 20 via primary winding 44, primary winding 72, junctions 94 and 100, terminal 90, load 93, terminal 92, junction 96, and conductor 91 to terminal 22. Current also will flow from terminal 20 via primary windings 44 and 72, junctions 94 and 100, parallel connected capacitor 112 and primary winding 104 of transformer 102, resistor 113, junction 96, and conductor 91 to terminal 22. In addition, current will flow from terminal 20 via primary windings 44 and 72, junction 94, resistor 98, junction 96, and conductor 91 to terminal 22. Moreover, current will flow from terminal 20 via the autotransformer 24 to the terminal 22.

The transformer 70 will respond to the current flowing through the primary winding 72 thereof to force current to flow from the right-hand terminal of the secondary winding 74 thereof via the input terminal 80 of bridge rectifier 76, the upper right-hand leg of that bridge rectifier, output terminal 82, Zener diode 87, output terminal 84, the lower left-hand leg of that bridge rectifier, and input terminal 78 to the left-hand terminal of that secondary winding; and that Zener diode will respond to that current to establish a predetermined upper limit on the voltage across the secondary winding 74, and will thus establish a predetermined upper limit on the voltage across the primary winding 72. Current also will flow from the right-hand terminal of secondary winding 74 via input terminal 80, resistor 88, the gate-to-cathode circuit of controlled rectifier 54, junctions 58 and 86, output terminal 84, the lower left-hand diode of bridge rectifier 76, and input terminal 78 to the left-hand terminal of that secondary winding. As a result, that controlled rectifier will become conductive almost immediately after the terminal 20 becomes positive relative to the terminal 22. The transformer 42 will respond to the current flowing through the primary winding 44 thereof to force current to flow from the outer terminal of secondary winding 46 thereof via controlled rectifier 54, junction 58, inductor 62, junction 66, capacitor 67, and junctions 68 and 50 to the inner terminal of that winding. That current flow will be only momentary in nature, because the capacitor 67 will not pass direct current; but that current flow will tend to charge that capacitor so the junction 66 is positive relative to the junction 68. Current also will flow from the outer terminal of secondary winding 46 via controlled rectifier 54, junction 58, inductor 62, junction 66, inductor 60, tap 28, the upper section of autotransformer 24, tap 26, junction 32, diode 202, junctions 206 and 192, resistor 198, junction 194, Zener diode 200, and junctions 196, 40, 68 and 50 to the inner terminal of that secondary winding; and that current will cause the voltage between the junctions 194 and 196 to rise to the rated voltage of that Zener diode and then remain at that level throughout most of the rest of the half cycle of the alternating current supplied to the terminals 20 and 22. The resistor 198 will serve as a current limiting resistor for the Zener diode 200. Likewise, current will flow from the outer terminal of secondary winding 46 via controlled rectifier 54, junction 58, inductor 62, junction 66, inductor 60, tap 28, the upper section of autotransformer 24, tap 26, junction 32, diode 202, junctions 206 and 192, resistor 190, junction 176, diode 174, junctions 172 and 194, Zener diode 200, junctions 196, 40, 68 and 50 to the inner terminal of that secondary winding; and that current will cause the voltage at the junction 176 to rise to a value which is slightly higher than the rated voltage of the Zener diode and then remain at that level throughout most of the rest of the half cycle of the alternating current supplied to the terminals 20 and 22. The resulting limitation on the voltage at the junction 176, and hence at the junction 158, enables a low resistance resistor 156— for example a sixty-eight ohm resistor—to be used while also enabling the voltage at the emitter of the unijunction transistor 168 to be less than one-half of the base two base one voltage of that unijunction transistor. The use of such a low value resistor is desirable because it can permit prompt charging of the capacitor 162. The resistor 190 will serve as a current limiting resistor for the diode 174 and for the Zener diode 200. Additionally, current will flow from the outer terminal of secondary winding 46 via controlled rectifier 54, junction 58, inductor 62, junction 66, inductor 60, tap 28, the upper section of autotransformer 24, tap 26, junction 32, diode 202, junctions 206 and 192, resistor 190, junctions 176 and 158, resistor 166, and junctions 164, 184, 196, 40, 68 and 50 to the inner terminal of that secondary winding; and that current will reduce the amount of power which the Zener diode 200 must dissipate in the form of heat. Also, current will flow from the outer terminal of secondary winding 46 via controlled rectifier 54, junction 58, inductor 62, junction 66, inductor 60, tap 28, the upper section of autotransformer 24, tap 26, junction 32, diode 202, junctions 206 and 192, resistor 190, junctions 176 and 158, resistor 156, transistor 154, junction 160, capacitor 162, and junctions 164, 184, 196, 40, 68 and 50 to the inner terminal of that secondary winding; and that current will start charging the capacitor 162.

The transformer 102 will respond to the flow of current through the primary winding 104 thereof to force current to flow from the outer terminal of secondary winding 108 thereof via diode 116, junction 118, resistor 120, inductor 122, junctions 126, 130 and 140, resistor 146, junction 148, Zener diode 150, and junctions 132, 128 and 110 to the inner terminal of that secondary winding; and that current will cause the Zener diode 150 to establish a predetermined voltage at the emitters of transistors 144 and 154. The transformer 102 also will respond to the flow of current through the primary winding 104 thereof to force current to flow from the outer terminal of secondary winding 108 thereof via diode 116, junction 118, resistor 120, inductor 122, junctions 126 and 130, resistor 136, junction 134, resistor 138, and junctions 132, 128 and 110 to the inner terminal of that secondary winding; and that current will make the junction 134, and hence the base of transistor 144, positive relative to the junction 148, and hence positive relative to the emitter of that transistor. Consequently, current will flow from the outer terminal of secondary winding 108 via diode 116, junction 118, resistor 120, inductor 122, junctions 126 and 130, resistor 136, junction 134, the base-emitter circuit of transistor 144, junction 148, Zener diode 150, and junctions 132, 128 and 110 to the inner terminal of that secondary winding; and that current will render that transistor conductive. As a result, current will flow from the outer terminal of secondary winding 108 via diode 116, junction 118, resistor 120, inductor 122, junctions 126, 130 and 140, resistor 142, junction 152, transistor 144, junction 148, Zener diode 150, and junctions 132, 128 and 110 to the inner terminal of that secondary winding; and the resulting voltage drop across that transistor will determine the base-emitter voltage of transistor 154, and will thus determine the conductivity of that latter transistor—thereby determining the charging rate of the capacitor 162. When the voltage across that capacitor reaches the emitter peak point voltage of the unijunction transistor 168, that unijunction transistor will become conductive.

As the unijunction transistor 168 becomes conductive, current will flow from the outer terminal of secondary winding 46 via controlled rectifier 54, junction 58, inductor 62, junction 66, inductor 60, tap 28, the upper section of autotransformer 24, tap 26, junction 32, diode 202, junctions 206 and 192, resistor 190, junction 176, diode 174, junction 172, resistor 170, the base two base one circuit of unijunction transistor 168, junctions 178 and 180, resistor 182, and junctions 184, 196, 40, 68 and 50 to the inner terminal of that secondary winding; and that current will cause the resistor 182 to develop a voltage which junction 178 and resistor 186 and which junctions 184, 196 and 40 will apply to the gate-to-cathode circuit of controlled rectifier 36. That voltage will render that controlled rectifier conductive; and, thereupon, current will flow from the outer terminal of secondary winding 46 via controlled rectifier 54, junction 58, inductor 62, junction 66, inductor 60, tap 28, the upper section of autotransformer 24, tap 26, junction 32, controlled rectifier 36, and junctions 40, 68 and 50 to the inner terminal of that secondary winding. That flow of current will develop inductive energy in the inductor 60. Also as the unijunction transistor 168 becomes conductive, the capacitor 162 will discharge through the emitter base one circuit of that unijunction transistor and through the resistor 182. The controlled rectifiers 54 and 36 will remain conductive throughout the rest of the first half cycle of the alternating current supplied to the terminals 20 and 22 by the source 18. However, at the end of that first half cycle the current flowing through the controlled rectifier 54 will fall to zero; and, thereupon, that controlled rectifier will become non-conductive.

During that first half cycle, the secondary windings 46 and 48 of transformer 42 charged the capacitor 52 so the left-hand terminal thereof was positive relative to the right-hand terminal thereof; and, at the end of that half cycle, that capacitor was still charged with the left-hand terminal thereof positive. Also, during that first half-cycle, a substantial amount of inductive energy was developed in the inductor 60; and, at the end of that first half cycle, that energy forced current to continue to flow through that inductor, and that current flowed from the left-hand terminal of that inductor via tap 28, the upper section of the autotransformer 24, tap 26, junction 32, controlled rectifier 36, junctions 40 and 68, capacitor 67, and junction 66 to the right-hand terminal of that inductor. That current maintained that controlled rectifier conductive even though the voltage between the terminals 20 and 22 fell to zero; and that current flow tended to charge the capacitor 67 so the junction 68 was positive relative to the junction 66.

During the next half cycle of the alternating current supplied to terminals 20 and 22 by the source 18, the voltage at terminal 22 will be positive relative to the voltage at terminal 20; and current will flow from terminal 22 via conductor 91, junction 96, terminal 92, load 93, terminal 90, junctions 100 and 94, and primary windings 72 and 44 to the terminal 20. Current also will flow from terminal 22 via conductor 91, junction 96, resistor 113, primary winding 104, junctions 100 and 94, and primary windings 72 and 44 to terminal 20. In addition, current will flow from terminal 22 via conductor 91, junction 96, resistor 98, junction 94, and primary windings 72 and 44 to terminal 20. Moreover, current will flow from terminal 22 via autotransformer 24 to terminal 20.

The transformer 70 will respond to the current flowing through the primary winding 72 thereof to force current to flow from the left-hand terminal of the secondary winding 74 thereof via input terminal 78 of bridge rectifier 76, the upper left-hand leg of that bridge rectifier, output terminal 82, Zener diode 87, output terminal 84, the lower righthand leg of that bridge rectifier, and input terminal 80 to the right-hand terminal of that secondary winding; and that Zener diode will again establish upper limits on the voltages across the windings 74 and 72. Current also will flow from the left-hand terminal of secondary winding 74 via input terminal 78, resistor 95, the gate-to-cathode circuit of controlled rectifier 56, junction 86, output terminal 84, the lower right-hand diode of bridge rectiright hand leg of that bridge rectifier, and input terminal of that secondary winding. As a result, that controlled rectifier will become conductive almost immediately after the terminal 22 becomes positive relative to the terminal 20. The transformer 42 will respond to the current flowing through the primary winding 44 thereof to force current to flow from the outer terminal of secondary winding 48 thereof via controlled rectifier 56, junctions 86 and 58, inductor 62, junction 66, capacitor 67, and junctions 68 and 50 to the inner terminal of that winding. That current flow will be only momentary in nature, because the capacitor 67 will not pass direct current; but that current flow will tend to charge that capacitor so the junction 66 is positive relative to the junction 68. Current also will flow from the outer terminal of the secondary winding 48 via the controlled rectifier 56, junctions 86 and 58, the inductor 62, junction 66, the inductor 60, tap 28, the upper section of autotransformer 24, tap 26, junction 32, the controlled rectifier 36, and junctions 40, 68 and 50 in the inner terminal of that secondary winding. The voltage which that autotransformer develops across the upper section thereof will oppose that flow of current; but the inductor 60 acts as a voltage source and will coact with the transformer 42 to assure the said flow of current; and that flow of current will continue until the controlled rectifier 38 is rendered conductive.

Current also will flow from the outer terminal of secondary winding 48 via controlled rectifier 56, junctions 86 and 58; inductor 62, junction 66, inductor 60, tap 28, the middle section of autotransformer 24, tap 30, junction 34, diode 204, junctions 206 and 192, resistor 198, junction 194, Zener diode 200, and junctions 196, 40, 68 and 50 to the inner terminal of that secondary winding; and that current will cause the voltage between the junctions 194 and 196 to rise to the rated voltage of that Zener diode and then remain at that level throughout most of the rest of the second half cycle of the alternating current supplied to the terminals 20 and 22. Likewise, current will flow from the outer terminal of secondary winding 48 via controlled rectifier 56, junctions 86 and 58; inductor 62, junction 66, inductor 60, tap 28, the middle section of autotransformer 24, tap 30, junction 34, diode 204, junctions 206 and 192, resistor 190, junction 176, diode 174, junctions 172 and 194, Zener diode 200, junctions 196, 40, 68 and 50 to the inner terminal of that secondary winding; and that current will cause the voltage at the junction 176 to rise to a value which is slightly higher than the rated voltage of that Zener diode and then remain at that level throughout most of the rest of the second half cycle of the alternating current supplied to the terminals 20 and 22. Additionally, current will flow from the outer terminal of secondary winding 48 via controlled rectifier 56, junctions 86 and 58; inductor 62, junction 66, inductor 60, tap 28, the middle section of autotransformer 24, tap 30, junction 34, diode 204, junctions 206 and 192, resistor 190, junctions 176 and 158, resistor 166, and junctions 164, 184, 40, 68 and 50 to the inner terminal of that secondary winding. Also, current will flow from the outer terminal of secondary winding 48 via controlled rectifier 56, junctions 86 and 58, inductor 62, junction 66, inductor 60, tap 28, the middle section of autotransformer 24, tap 30, junction 34, diode 204, junctions 206 and 192, resistor 190, junctions 176 and 158, resistor 156, transistor 154, junction 160, capacitor 162, and junctions 164 and 184, 196, 40, 68 and 50 to the inner terminal of that secondary winding; and that current will again start charging the capacitor 162.

The transformer 102 will respond to the flow of current through the primary winding 104 thereof to force current to flow from the outer terminal of secondary winding 106 thereof via diode 114, junction 118, resistor 120, inductor 122, junctions 126, 130 and 140, resistor 146, junction 148, Zener diode 150, and junctions 132, 128 and 110 to the inner terminal of that secondary winding; and that current will cause the Zener diode 150 to establish a predetermined voltage at the emitters of transistors 144 and 154. The transformer 102 also will respond to the flow of current through the primary winding 104 thereof to force current to flow from the outer terminal of secondary winding 106 thereof via diode 114, junction 118, resistor 120, inductor 122, junctions 126 and 130, resistor 136, junction 134, resistor 138, and junctions 132, 128 and 110 to the inner terminal of that secondary winding; and that current will make the junction 134, and hence the base of transistor 144, positive relative to the junction 148, and hence positive relative to the emitter of that transistor. Consequently, current will flow from the outer terminal of secondary winding 106 via diode 114, junction 118, resistor 120, inductor 122, junctions 126 and 130, resistor 136, junction 134, the base-emitter circuit of transistor 144, junction 148, Zener diode 150, and junctions 132, 128 and 110 to the inner terminal of that secondary winding; and that current will render that transistor conductive. As a result, current will flow from the outer terminal of secondary winding 106 via diode 114, junction 118, resistor 120, inductor 122, junctions 126, 130 and 140, resistor 142, junction 152, transistor 144, junction 148, Zener diode 150, and junctions 132, 128 and 110 to the inner terminal of that secondary winding; and the resulting voltage drop across that transistor will determine the base-emitter voltage of transistor 154, and will thus determine the conductivity of that latter transistor—thereby determining the charging rate of the capacitor 162. When the voltage across that capacitor reaches the emitter peak point voltage of the unijunction transistor 168, that unijunction transistor will become conductive.

As the unijunction transistor 168 becomes conductive, current will flow from the outer terminal of secondary winding 48 via controlled rectifier 56, junctions 86 and 58, inductor 62, junction 66, inductor 60, tap 28, the middle section of autotransformer 24, tap 30, junction 34, diode 204, junctions 206 and 192, resistor 190, junction 176, diode 174, junction 172, resistor 170, the base two base one circuit of unijunction transistor 168, junctions 178 and 180, resistor 182, and junctions 184, 196, 40, 68 and 50 to the inner terminal of that secondary winding; and that current will cause the resistor 182 to develop a voltage which junction 180 and resistor 188 and which junctions 184, 196 and 40 will apply to the gate-to-cathode circuit of controlled rectifier 38. That voltage will render that controlled rectifier conductive; and, thereupon, current will flow from the outer terminal of secondary winding 48 via controlled rectifier 56, junctions 86 and 58, inductor 62, junction 66, inductor 60, tap 28, the middle section of autotransformer 24, tap 30, junction 34, controlled rectifier 38, and junctions 40, 68 and 50 to the inner terminal of that secondary winding. That flow of current will develop inductive energy in the inductor 60. At this time the negative voltage at the terminal 20, and hence at the anode of controlled rectifier 36, and the positive voltage at the tap 30, and hence at the cathode of that controlled rectifier, will tend to cause reverse current to flow in that controlled rectifier, and will thereby render that controlled rectifier nonconductive. Also as the unijunction transistor 168 becomes conductive, the capacitor 162 will discharge through the emitter base one circuit of that unijunction transistor and through the resistor 182. The controlled rectifiers 56 and 38 will remain conductive throughout the rest of the second half cycle of the alternating current supplied to the terminals 20 and 22 by the source 18. However, at the end of that second half cycle the current flowing through the controlled rectifier 56 will fall to zero; and, thereupon, that controlled rectifier will become nonconductive.

During that second half cycle, the secondary windings 46 and 48 of transformer 42 discharged the capacitor 52 and then charged that capacitor so the right-hand terminal thereof was positive relative to the left-hand terminal thereof; and, at the end of that half cycle, that capacitor was still charged with the right-hand terminal thereof positive. Also during that second half cycle, additional inductive energy was developed in the inductor 60; and, at the end of that second half cycle, that energy forced current to continue to flow through that inductor, and that current flowed from the left-hand terminal of that inductor via tap 28, the middle section of autotransformer 24, tap 30, junction 34, controlled rectifier 38, junctions 40 and 68, capacitor 67, and junction 66 to the right-hand terminal of that inductor. That current maintained that controlled rectifier conductive even though the voltage between the terminals 20 and 22 fell to zero; and that current flow tended to charge the capacitor 67 so the junction 68 was positive relative to the junction 66.

During the third and all succeeding odd-numbered half cycles of the alternating current supplied to the terminals 20 and 22 by the source 18, current will flow from that source through the primary windings 44 and 72 and the load 93, through those primary windings and resistor 98, and through those primary windings and parallel connected capacitor 112 and primary winding 104. In addition, the transformer 70 and the bridge rectifier 76 will coact to promptly render the controlled rectifier 54 conductive; and some current will then flow from the outer terminal of secondary winding 46 via controlled rectifier 54, inductor 62, and capacitor 67 to the inner terminal of that secondary winding, while other current will flow from that outer terminal via controlled rectifier 54, inductors 62 and 60, the middle section of autotransformer 24, and controlled rectifier 38 to the inner terminal of that secondary winding. The said same current will tend to make junction 66 positive relative to the junction 68; but that current will be of short duration. The other current will, however, continue to flow until the controlled rectifier 36 is rendered conductive. That controlled rectifier will be rendered conductive when the unijunction transistor 168 "fires"; and thereafter current will flow from the outer terminal of secondary winding 46 via controlled rectifier 54, inductors 62 and 60, the upper section of autotransformer 24, and controlled rectifier 36 to the inner terminal of that secondary winding.

At the end of the third and all succeeding odd-numbered half cycles of the alternating current supplied to the terminals 20 and 22 by the source 18, the controlled rectifier 54 will become nonconductive. However, the inductive energy in the inductor 60 will force current to continue to flow through the controlled rectifier 36, and thereby keep that controlled rectifier conductive; and that current will flow from the left-hand terminal of that inductor via the upper section of autotransformer 24, controlled rectifier 36, and capacitor 67 to the right-hand terminal of that inductor. That current will tend to make the junction 68 positive relative to the junction 66.

During the fourth and all succeeding even-numbered half cycles of the alternating current supplied to the terminals 20 and 22 by the source 18, current will flow from that source through load 93 and the primary windings 72 and 44, through resistor 98 and those primary windings, and through parallel-connected capacitor 112 and primary winding 104 and those primary windings. In addition, the transformer 70 and the bridge rectifier 76 will coact to promptly render the controlled rectifier 56 conductive; and some current will then flow from the outer terminal of secondary winding 48 via controlled rectifier 56, inductor 62, and capacitor 67 to the inner terminal of that secondary winding, while other current will flow from that outer terminal via controlled rectifier 56, inductors 62 and 60 the upper section of autotransformer 24, and controlled rectifier 36 to the inner terminal of that secondary winding. The said same current will tend to make junction 66 positive relative to the junction 68; but that current will be of short duration. The other current will, however, continue to flow until the controlled rectifier 38 is rendered conductive. That controlled rectifier will be rendered conductive when minal of that secondary winding. The said some current will flow from the outer terminal of secondary winding 48 via controlled rectifier 56, inductors 62 and 60, the middle section of autotransformer 24, and controlled rectifier 38 to the inner terminal of that secondary winding.

At the end of the fourth and all succeeding even-numbered half cycles of the alternating current supplied to the terminals 20 and 22 by the source 18, the controlled rectifier 56 will become non-conductive. However, the inductive energy in the inductor 60 will force current to continue to flow through the controlled rectifier 38, and thereby keep that controlled rectifier conductive; and that current will flow from the left-hand terminal of that inductor via the middle section of autotransformer 24, controlled rectifier 38, and capacitor 67 to the right-hand terminal of that inductor. That current will tend to make the junction 68 positive relative to the junction 66.

During each of the odd-numbered half cycles of the alternating current supplied to terminals 20 and 22 by the source 18, the controlled rectifier 36 will become conductive and will make the voltage at the junction 40 substantially equal to the voltage at the terminal 20—and hence positive relative to the voltage at the tap 28. The voltage at the junction 40 will continue to be positive relative to the voltage at the tap 28 throughout the rest of that half cycle.

At the begnnning of the succeeding even-numbered half cycle of the alternating current supplied to the terminals 20 and 22 by the source 18, the controlled rectifier 36 will be kept conductive by the inductive energy in the inductor 60, and that controlled rectifier will continue to make the voltage at the junction 40 substantially equal to the voltage at the terminal 20, and hence negative relative to the voltage at the tap 28. The voltage at the junction 40 will continue to be negative relative to the voltage at the tap 28 until the controlled rectifier 38 becomes conductive and the controlled rectifier 36 becomes nonconductive.

As the controlled rectifier 38 becomes conductive, during that succeeding even-numbered half cycle, it will make the voltage at the junction 40 substantially equal to the voltage at the tap 30—and hence positive relative to the voltage at the tap 28. The voltage at the junction 40 will continue to be positive relative to the voltage at the tap 28 throughout the rest of that half cycle.

At the beginning of the succeeding odd-numbered half cycle of the alternating current supplied to the terminals 20 and 22 by the source 18, the controlled rectifier 38 will be kept conductive by the inductive energy in the inductor 60, and that controlled rectifier will continue to make the voltage at the junction 40 substantially equal to the voltage at the tap 30, and hence negative to the voltage at the tap 28. The voltage at the junction 40 will continue to be negative relative to the voltage at the tap 28 until the controlled rectifier 36 becomes conductive and the controlled rectifier 38 becomes non-conductive.

As the controlled rectifier 36 becomes conductive during that succeeding odd-numbered half cycle of the alternating current supplied to the terminals 20 and 22 by the source 18, the junction 40 will again become positive relative to the tap 28. All of this means that during each half cycle of the alternating current supplied to the terminals 20 and 22 by the source 18, the junction 40 will alternately become positive and negative relative to the tap 28. Whenever that junction is positive relative to that tap, the capacitor 67 will tend to charge so the junction 68 will be positive relative to the junction 66. Conversely, whenever the junction 40 is negative relative to the tap 28, the capacitor 67 will tend to charge so the junction 66 will be positive relative to the junction 68. The magnitude and polarity of the charge on the capacitor 67 and hence the magnitude and polarity of the voltage developed between the junctions 68 and 66 will be a function of the positive-going volt seconds and of the negative-going volt seconds supplied to that capacitor by the autotransformer 24 and the controlled rectifiers 36 and 38. Where the positive-going volt seconds substantially equal the negative-going volt seconds supplied to the capacitor 67 during each cycle, the net charge on that capacitor, and the net voltage between the junctions 68 and 66, will, effectively, be zero.

The values of the components of the voltage sensing subcircuit 209 and the values of the components of the subcircuit 207, which supplies firing signals to the controlled rectifiers 36 and 38, are selected so that whenever the voltage across the load 93 is at the desired value, the controlled rectifiers 36 and 38 will be fired, respectively, at ninety degrees and at two hundred and seventy degrees during every cycle of the alternating current supplied to the terminals 20 and 22 by the source 18. Thus, as shown by the uppermost waveform of FIG. 2, the controlled rectifier 36 "fires" at ninety degrees and continues to conduct current to one hundred and eighty degrees to provide the positive-going volt seconds 210. That controlled rectifier will continue to conduct current from one hundred and eighty degrees to two hundred and seventy degrees to provide the negative-going volt seconds 211. The controlled rectifier 38 fires at two hundred and seventy degrees and continues to conduct current to three hundred and sixty degrees to provide the positive-going volt seconds 212. That controlled rectifier will continue to conduct current from zero degrees of the second cycle to ninety degrees of that second cycle to provide the negative-going volt seconds 213. The controlled rectifier 36 will fire again at ninety degrees of the second cycle and will continue to conduct current to one hundred and eighty degrees of that second cycle to provide the positive-going volt seconds 214. That controlled rectifier will continue to conduct current from one hundred and eighty degrees of that second cycle to two hundred and seventy degrees to provide the negative-going volt seconds 215. The controlled rectifier 38 will fire again at two hundred and seventy degrees of that second cycle and will continue to conduct current to three hundred and sixty degrees of that second cycle to provide the positive-going volt seconds 216. The magnitude of each of the positive-going volt seconds 210, 212, 214 and 216 will be equal to the magnitude of each of the negative-going volt seconds 211, 213 and 215; and hence the net charge on the capacitor 67 and the net voltage between the junction 68 and 66 will be zero.

If the voltage across the load 93 becomes lower than the desired value, the voltage developed across the primary winding 104 of transformer 102 will become lower than normal; and hence the voltage at the junction 134—and thus at the base of the transistor 144—will become lower than normal. Because the voltage at the emitter of that transistor will be held substantially fixed by the Zener diode 150, the base-emitter voltage—and hence the base-emitter current—of that transistor will become lower than normal. The resulting increase in the resistance of that transistor, and hence in the voltage drop across that transistor, will make the base-emitter voltage, and hence the base-emitter current, of the transistor 154 higher than normal. The resulting greater-than-normal conductivity of that transistor will make the capacitor 162 charge more rapidly than normal; and hence the unijunction transistor 168 will fire earlier-than-normal during each half cycle of the alternating current supplied to the terminals 20 and 22 by the source 18. This means that the controlled rectifiers 36 and 38 will be fired, respectively, before ninety degrees and before two hundred and seventy degrees during each cycle of the alternating current supplied to the terminals 20 and 22 by the source 18.

The exact angles at which the controlled rectifiers 36 and 38 will be fired will be functions of the difference between the voltage across the load 93 and the desired voltage; and the greater the difference between those voltages the earlier those controlled rectifier will be fired. For purposes of illustration, it will be assumed that the voltage across the load 93 is sufficiently lower than the desired voltage to cause the controlled rectifier 36 to fire at thirty degrees and to cause the controlled rectifier 38 to fire at two hundred and ten degrees. Then, as shown by the second uppermost waveform of FIG. 2, the controlled rectifier 36 will fire at thirty degrees and will continue to conduct current to one hundred and eighty degrees to provide the positive-going volt seconds 218. That controlled rectifier will continue to conduct current from one hundred and eighty degrees to two hundred and ten degrees to provide the negative-going volt seconds 219. The controlled rectifier 38 will fire at two hundred and ten degrees and will continue to conduct current to three hundred and sixty degrees to provide the positive-going volt seconds 220. That controlled rectifier will continue to conduct current from zero degrees of the second cycle to thirty degrees of that second cycle to provide the negative-going volt seconds 221. The controlled rectifier 36 will fire again at thirty degrees of that second cycle and will continue to conduct current to one hundred and eighty degrees of that second cycle to provide the positive-going volt seconds 222. That controlled rectifier will continue to conduct current from one hundred and eighty degrees of that second cycle to two hundred and ten degrees of that second cycle to provide the negative-going volt seconds 223. The controlled rectifier 38 will fire again at two hundred and ten degrees of that second cycle and will continue to conduct current to three hundred and sixty degrees of that second cycle to provide the positive-going volt seconds 224. The magnitude of each of the positive-going volt seconds 218, 220, 222 and 224 will be greater than the magnitude of each of the negative-going volt seconds 219, 221 and 223; and hence there will be a net charge on the capacitor 67. That charge will cause that capacitor to tend to act as a source of voltage; and that charge will make the junction 50 positive relative to the junction 58.

The transformer 42, the capacitor 52, the inductor 62, and the controlled rectifiers 54 and 56 will respond to the voltage across junctions 50 and 58 to act as a parallel inverter. Specifically, during each odd-numbered half cycle of the alternating current suppled to the terminals 20 and 22 by the source 18, the transformer 70 and the bridge rectifier 76 will coact to promptly fire controlled rectifier 54; and then current will flow from the upper terminal of capacitor 67 via junctions 68 and 50, secondary winding 46, controlled rectifier 54, junction 58, inductor 62, and junction 66 to the lower terminal of that capacitor. That current flow will cause the transformer 42 to develop a voltage pulse across the primary winding 44 thereof; and the voltage pulses from two odd-numbered half cycles are denoted by the numeral 225 in the middle waveform of FIG. 2.

During each even-numbered half-cycle of the alternating current supplied to the terminals 20 and 22 by the source 18, the transformer 70 and the bridge rectifier 76 will co-act to promptly fire controlled rectifier 56; and then current will flow from the upper terminal of capacitor 67 via junctions 68 and 50, secondary winding 48, controlled rectifier 56, junctions 86 and 58, inductor 62, and junction 66 to the lower terminal of that capacitor. That current flow will cause the transformer 42 to develop a voltage pulse across the primary winding 44 thereof; and the voltage pulses from two even-numbered half cycles are denoted by the numeral 226 in FIG. 2.

During each odd-numbered half cycle of the alternating current supplied to the terminals 20 and 22 by the source 18, the current flowing from the upper terminal of capacitor 67 via secondary winding 46, controlled rectifier 54, and inductor 62 to the lower terminal of that capacitor will, by transformer action, develop a voltage across the series-connected secondary windings 46 and 48 that will be about twice the voltage across the terminals 68 and 66. That developed voltage will be applied to the capacitor 52; and that developed voltage will make the right-hand terminal of that capacitor positive relative to the left-hand terminal of that capacitor. As a result, when the controlled rectifier 56 subsequently becomes conductive at the start of the next succeeding even-numbered half cycle of the alternating current supplied to the terminals 20 and 22 by the source 18, that developed voltage will be applied to the controlled rectifier 54 and will promptly render that controlled rectifier nonconductive by tending to cause reverse current flow through that controlled rectifier. During each even-numbered half cycle of the alternating current supplied to the terminals 20 and 22 by the source 18, the current flowing from the upper terminal of capacitor 67 via secondary winding 48, controlled rectifier 56, and inductor 62 to the lower terminal of that capacitor will, by transformer action, develop a voltage across the series-connected secondary windings 48 and 46 that will be about twice the voltage across the terminals 68 and 66. That developed voltage will be applied to the capacitor 52; and the developed voltage will make the left-hand terminal of that capacitor positive relative to the right-hand terminal of that capacitor. As a result, when the controlled rectifier 54 subsequently becomes conductive at the start of the next succeeding odd-numbered half cycle of the alternating current supplied to the terminals 20 and 22 by the source 18, that developed voltage will be applied to the controlled rectifier 56 and will promptly render that controlled rectifier non-conductive by tending to cause reverse current flow through that controlled rectifier. The inductor 62 acts as a ballast or choke, and thereby keeps excessive current from flowing during the instant when one of the controlled rectifiers 54 and 56 is being rendered conductive and the other of those controlled rectifiers is being rendered nonconductive. The inductor 62 will have inductive energy stored within it during the said instant, but the diode 64 will provide a low resistance discharge path for that inductive energy.

The controlled rectifiers 54 and 56 will, respectively, be rendered conductive almost immediately after the start of each odd numbered and each even-numbered half cycle of the alternating current supplied to the terminals 20 and 22 by the source 18. Further, those controlled rectifiers will instantly become substantially fully conductive; and hence the voltage pulses 225 and 226 will essentially constitute a square wave output voltage which has the zero crossovers thereof substantially congruent with the zero crossovers of the sinusoidal current supplied by the source 18. The polarity of the square wave output voltage constituted by the voltage pulses 225 and 226 is such that those voltage pulses will aid the sinusoidal voltage supplied by the source 18. The magnitude of the square wave output voltage constituted by the voltage pulses 225 and 226 is linearly dependent upon the voltage across the capacitor 67, and is thus a function of the net volt seconds supplied to that capacitor. The overall result is that the primary winding 44 of transformer 42 superimposes a corrective voltage upon the voltage supplied by the source 18; and that corrective voltage will increase the voltage across the load 93 to, and will hold that voltage at, the desired level.

If the voltage supplied by the source 18 falls even further below the desired value, each of the controlled rectifiers 36 and 38 will be fired even closer to the start of the appropriate half cycle of the alternating current supplied to the terminals 20 and 22 by the source 18. This means that the total of the positive-going volt seconds applied to the capacitor 67 will be even greater than the total of the negative-going volt seconds applied to that capacitor; and hence a larger charge will be developed across that capacitor. The resulting larger voltage across the junctions 50 and 58 will increase the amplitude of the voltage pulses 225 and 226, thereby keeping the voltage across the load 93 at the desired value. However, if the voltage supplied by the source 18 approaches the desired value, each of the controlled rectifiers 36 and 38 will be fired closer to the midpoint of the appropriate half cycle of the alternating current supplied to the terminals 20 and 22 by the source 18. This means that the total of the positive-going volt seconds applied to the capacitor 67 will tend to approach the total of the negative-going volt seconds applied to that capacitor; and hence a smaller charge will be developed across that capacitor. The resulting smaller voltage across the junctions 50 and 58 will decrease the amplitude of the voltage pulses 225 and 226, thereby keeping the voltage across the load 93 at the desired value. The overall result is that the line voltage regulator of FIG. 1 will respond to a low input voltage to develop a corrective voltage and to superimpose that voltage upon that input voltage and thereby hold the output voltage at the desired value.

If the voltage across the load 93 is higher than the desired value, the voltage developed across the primary winding 104 of transformer 102 will be higher than normal; and hence the voltage at the junction 134—and thus at the base of the transistor 144—will be higher than normal. Because the voltage at the emitter of that transistor will be held substantially fixed by the Zener diode 150, the base-emitter voltage—and hence the base-emitter current—of that transistor will be higher than normal. The resulting decrease in resistance of that transistor, and hence in the voltage drop across that transistor, will make the base-emitter voltage, and hence the base-emitter current, of the transistor 154 lower than normal. The resulting greater-than-normal resistance of that transistor will make the capacitor 162 charge less rapidly than normal; and hence the unijunction transistor 168 will fire later-than-normal during each half cycle of that alternating current supplied to the terminals 20 and 22 by the source 18. This means that the controlled rectifiers 36 and 38 will be fired, respectively, after ninety degrees and after two hundred and seventy degrees during each cycle of the alternating current supplied to the terminals 20 and 22 by the source 18.

The exact angles at which the controlled rectifiers 36 and 38 will be fired will be functions of the difference between the voltage across the load 93 and the desired voltage; and the greater the difference between those voltages the later those controlled rectifiers will be fired. For purposes of illustration, it will be assumed that the voltage across the load 93 is sufficiently higher than the desired voltage to cause the controlled rectifier 36 to fire at one hundred and fifty degrees and to cause the controlled rectifier 38 to fire at three hundred and thirty degrees. Then, as shown by the second lowermost waveform of FIG. 2, the controlled rectifier 36 will fire at one hundred and fifty degrees and will continue to conduct current to one hundred and eighty degrees to provide the positive-going volt seconds 227. That controlled rectifier will continue to conduct current from one hundred and eighty degrees to three hundred and thirty degrees to provide the negative-going volt seconds 228. The controlled rectifier 38 will fire at three hundred and thirty degrees and will continue to conduct current to three hundred and sixty degrees to provide the positive-going volt seconds 229. That controlled rectifier will continue to conduct current from zero degrees of the second cycle to one hundred and fifty degrees of that second cycle to provide the negative-going volt seconds 231. The controlled rectifier 36 will fire again at one hundred and fifty degrees of that second cycle and will continue to conduct current to one hundred and eighty degrees of that second cycle to provide the positive-going volt seconds 233. That controlled rectifier will continue to conduct current from one hundred and eighty degrees of that second cycle to three hundred and thirty degrees of that second cycle to provide the negative-going volt seconds 235. The controlled rectifier 38 will fire again at three hundred and thirty degrees of that second cycle and will continue to conduct current to three hundred and sixty degrees of that second cycle to provide the positive-going volt seconds 237. The magnitude of each of the positive-going volt seconds 227, 229, 233 and 237 will be smaller than the magnitude of each of the negative-going volt seconds 228, 231 and 235; and hence there will be a net charge on the capacitor 67. That charge will cause that capacitor to tend to act as a source of voltage; and that charge will make the junction 50 negative relative to the junction 58.

During each even-numbered half-cycle of the alternating current supplied to the terminals 20 and 22 by the source 18, the series-connected secondary windings 46 and 48 of transformer 42 will charge the capacitor 52 and will make the voltage at the left-hand terminal of that capacitor negative relative to the voltage at the right-hand terminal of that capacitor. The voltage at the left-hand terminal of that capacitor will, at the start of the next-succeeding odd-numbered half cycle of the alternating current supplied to the terminals 20 and 22 by the source 18, still be negative relative to the voltage at the right-hand terminal of that capacitor; and hence the controlled rectifier 54 will be reverse biased at the start of that next succeeding odd-numbered half cycle. That controlled rectifier will be additionally reverse biased by the voltage across the capacitor 67. This means that although the transformer 70 and the bridge rectifier 76 will coact to apply a firing signal to the controlled rectifier 54 immediately after the start of that next succeeding odd-numbered half cycle, that controlled rectifier will not instantaneously become conductive. Instead, the current from the series-connected secondary windings 46 and 48 of transformer 42 will flow through the capacitor 52; and that current will promptly discharge that capacitor and then charge that capacitor so the voltage at the left-hand terminal thereof is positive relative to the voltage at the right-hand terminal thereof. As that current causes the voltage across the capacitor 52 to reach a value slightly greater than twice the value of the voltage across the capacitor 67, the reverse bias on the controlled rectifier 54 will disappear; and that controlled rectifier will then respond to the continuing firing signal, supplied by the transformer 70 and the bridge rectifier 76, to become conductive. As the voltage across the capacitor 52, and hence across the series-connected secondary windings 46 and 48 of transformer 42, rises, the voltage across the primary winding 44 also will rise; and the voltage pulse 239 in the lowermost waveform of FIG. 2 will result.

As the controlled rectifier 54 becomes conductive, current will initially flow from the outer terminal of secondary winding 46 via that controlled rectifier, junction 58, inductor 62, junction 66, inductor 60, tap 28, the middle section of autotransformers 24, tap 30, junction 34, controlled rectifier 38, and junctions 40, 68 and 50 to the inner terminal of that secondary winding, and will subsequently flow from the outer terminal of that secondary winding via that controlled rectifier, junction 58, inductor 62, junction 66, inductor 60, tap 28, the upper section of autotransformer 24, tap 26, junction 32, controlled rectifier 36, and junctions 40, 68 and 50 to the inner terminal of that secondary winding. The ampere second of flow through the middle section of autotransformer 24 will exceed the ampere seconds of flow through the upper section of that autotransformer; and hence there will be a net current flow through that middle section. The autotransformer 24 will respond to that net current flow to "pump" some power from the transformer 42 back to the source 18. This means that during each odd-numbered half cycle of the alternating current supplied to the terminals 20 and 22 by the source 18, a voltage pulse 239 will be developed and some power from the transformer 42 will be pumped back into the source 18.

At the end of each odd-numbered halfcycle of the alternating current supplied to the terminals 20 and 22 by the source 18, the current flowing through the controlled rectifier 54 will fall to zero; and hence that controlled rectifier will become nonconductive. During each odd-numbered half cycle of the alternating current supplied to the terminals 20 and 22 by the source 18, the series-connected secondary windings 46 and 48 of transformer 42 will charge the capacitor 52 and will make the voltage at the right-hand terminal of that capacitor negative relative to the voltage at the left-hand terminal of that capacitor. The voltage at the right-hand terminal of that capacitor will, at the start of the next-succeeding even-numbered half cycle of the alternating current supplied to the terminals 20 and 22 by the source 18, still be negative relative to the voltage at the left-hand terminal of that capacitor; and hence the controlled rectifier 56 will be reverse biased at the start of that next succeeding even-numbered half cycle. That controlled rectifier will be additionally reverse biased by the voltage across the capacitor 67. This means that although the transformer 70 and the bridge rectifier 76 will apply a firing signal to the controlled rectifier 56 immediately after the start of that next succeeding even-numbered half cycle, that controlled rectifier will not instantaneously become conductive. Instead, the current from the series-connected windings 48 and 46 of transformer 42 will flow through the capacitor 52; and that current will promptly discharge that capacitor and then charge that capacitor so the voltage at the right-hand terminal thereof is positive relative to the voltage at the left-hand terminal thereof. As the current causes the voltage across the capacitor 52 to reach a value slightly greater than twice the value of the voltage across the capacitor 67, the reverse bias on the controlled rectifier 56 will disappear; and that controlled rectifier will then respond to the continuing firing signal, supplied by the transformer 70 and the bridge rectifier 76, to become conductive. As the voltage across the capacitor 52, and hence, across the series-connected secondary windings 46 and 48 of transformer 42, rises, the voltage across the primary winding 44 also will rise; and the voltage pulse 241 in the lowermost waveform of FIG. 2 will result.

As the controlled rectifier 56 becomes conductive, current will initially flow from the outer terminal of secondary winding 48 via that controlled rectifier, junctions 86 and 58, inductor 62, junction 66, inductor 60, tap 28, the upper section of autotransformer 24, tap 26, junction 32, controlled rectifier 36, and junctions 40, 68 and 50 to the inner terminal of that secondary winding, and will subsequently flow from the outer terminal of that secondary winding via that controlled rectifier, junction 58, inductor 62, junction 66, inductor 60, tap 28, the middle section of autotransformer 24, tap 30, junction 34, controlled rectifier 38, and junctions 40, 68 and 50 to the inner terminal of that secondary winding. The ampere seconds of flow through the upper section of autotransformer 24 will exceed the ampere seconds of flow through the middle section of that autotransformer; and hence there will be a net current flow through that upper section. The autotransformer 24 will respond to that net current flow to "pump" some power from the transformer 42 back to the source 18. This means that during each even-number half cycle of the alternating current supplied to the terminals 20 and 22 by the source 18, a voltage pulse 241 will be developed and some power from the transformer 42 will be pumped back into the source 18. At the end of each even-numbered half cycle of the alternating current supplied to the terminals 20 and 22 by the source 18, the current flowing through the controlled rectifier 56 will fall to zero; and hence that controlled rectifier will become nonconductive.

The transformer 42 will, during each half cycle of the alternating current supplied to the terminals 20 and 22 by the source 18, promptly discharge the capacitor 52 and then promptly charge that capacitor in the opposite direction; and this means that the voltage pulses 239 and 241 will essentially constitute a square wave output voltage which has the zero crossovers thereof substantially congruent with the zero crossovers of the sinusoidal voltage supplied by the source 18. The polarity of the square wave output voltage constituted by the voltage pulses 239 and 241 is such that those voltage pulses will buck the sinusoidal voltage supplied by the source 18.

The magnitude of the square wave output voltage constituted by the voltage pulses 239 and 241 is linearly dependent upon the voltage across the capacitor 67, and is thus a function of the net volt seconds supplied to that capacitor. The overall result is that the primary winding 44 of transformer 42 superimposes a corrective voltage upon the voltage supplied by the source 18; and the corrective voltage will reduce the voltage across the load 93 to, and will hold that voltage at, the desired level.

If the voltage supplied by the source 18 rises even further above the desired value, the controlled rectifiers 36 and 38 will be fired even closer to the end of the appropriate half-cycle of the alternating current supplied to the terminals 20 and 22 by the source 18. This means that the total of the positive-going volt seconds applied to the capacitor 67 will be even less than the total of the negative-going volt seconds applied to that capacitor; and hence a larger charge will be developed across that capacitor. The resulting larger voltage across the junctions 50 and 58 will cause the amplitude of the voltage pulses 239 and 241 to be increased, thereby making sure that the voltage across the load 93 remains at the desired value. However, if the voltage supplied by the source 18 approaches the desired value, each of the controlled rectifiers 36 and 38 will be fired closer to the midpoint of the appropriate half cycle of the alternating current supplied to the terminals 20 and 22 by the source 18. This means that the total of the positive-going volt seconds applied to the capacitor 67 will tend to approach the total of the negative-going volt seconds applied to that capacitor; and hence a smaller charge will be developed across that capacitor. The resulting smaller voltage across the junctions 50 and 58 will cause the amplitude of the voltage pulses 239 and 241 to be decreased, thereby making sure that the voltage across the load 93 remains at the desired value. The overall result is that the line voltage regulator of FIG. 1 will respond to high input voltage to develop a corrective voltage and to superimpose that voltage upon that input voltage and thereby hold the output voltage at the desired value.

It should thus be apparent that the line voltage regulator of FIG. 1 essentially permits the source 18 to apply its output voltage to the load 93 whenever that output voltage is at the desired value, and that the said line voltage regulator develops an essentially square wave corrective voltage and superimposes that corrective voltage upon that output voltage whenever that output voltage departs from that desired value. If that output voltage falls below that desired value, the corrective voltage will aid that output voltage; and that corrective voltage will thereby hold the voltage across the load 93 at substantially the desired value. If the output voltage rises above the desired value, the corrective voltage will buck that output voltage; and that corrective voltage will thereby hold the voltage across the load 93 at substantially the desired value. The overall result is that the voltage across the load 93 will remain substantially constant.

At the start of each half cycle, of the alternating current supplied to the terminals 20 and 22 by the source 18, wherein the net charge across the capacitor 67 makes the junction 68 positive relative to the junction 66, that capacitor will coact with the secondary windings 46 and 48 and with the capacitor 52 to render the previously-conducting controlled rectifier 54 or 56 nonconductive. The capacitor 52 will undergo a reversal of its terminal voltage at a rate controlled by the inductor 62; and, in controlling that rate, that inductor will experience an increase in energy. The dissipation of that energy in diode 64 will cause a voltage, equal to the conducting voltage of that diode, to appear across the terminals of that inductor; and that voltage will cause each of the voltage pulses 225 and 226 to have an initial amplitude that is proportionately greater than the voltage across the capacitor 67. As the energy of the inductor 62 dissipates, the amplitude of each of the voltage pulses 225 and 226 will become proportionate to the voltage across the capacitor 67. This means that the voltage pulses 225 and 226 will have configurations such as those shown in FIG. 2. While those voltage pulses will not define an idealistic square wave output voltage, they will define an essentially square wave output voltage.

At the start of each half cycle, of the alternating current supplied to the terminals 20 and 22 by the source 18, wherein the net charge across the capacitor 67 makes the junction 68 negative relative to the junction 66, that capacitor will initially reverse bias the controlled rectifier 54 and 56. The voltage across the series-connected secondary windings 46 and 48 of transformer 42 will quickly increase to the point where that reverse bias disappears, but that voltage increase will require a finite, although very short, period of time. Consequently, the leading edges of the voltage pulses 239 and 241 will not be perfectly vertical, all as shown by FIG. 2. While those voltage pulses will not define an idealistic square wave output voltage, they will define an essentially square wave output voltage.

If desired, the secondary windings 46 and 48 of transformer 42 could be wound as a center-tapped secondary winding. Similarly, the secondary windings 106 and 108 of the transformer 102 could be wound as a center-tapped secondary winding. Further, if desired, the capacitor 67 could be two or more series-connected capacitors.

Referring particularly to FIG. 3, the numerals 232 and 234 denote input terminals which can be connected to a suitable source 230 of single-phase sinusoidal alternating current. The numeral 251 denotes a diode that has the cathode thereof connected to the terminal 232. A resistor 253, a junction 255, and a resistor 257 connect the anode of that diode to the anode of a diode 259. The cathode of the latter diode is connected to the terminal 234. The numeral 236 denotes a controlled rectifier which has the anode thereof connected to the terminal 232 by a junction 244; and the numeral 238 denotes a controlled rectifier which has the anode thereof connected to the terminal 234 by a junction 248. The cathodes of those controlled rectifiers are connected together by a junction 246; and that junction is directly connected to junction 255. The numeral 240 denotes a controlled rectifier which has the cathode thereof connected to the terminal 232 by a junction 250 and the junction 244; and the numeral 242 denotes a controlled rectifier which has the cathode thereof connected to the terminal 234 by a junction 254 and the junction 248. The anodes of the controlled rectifier 240 and 242 are connected together by a junction 252. The numeral 256 denotes a controlled rectifier which has the anode thereof connected to the terminal 232 by junctions 264, 250 and 244; and the numeral 258 denotes a controlled rectifier which has the anode thereof connected to the terminal 234 by junctions 268, 254 and 248. The cathodes of the controlled rectifiers 256 and 258 are connected together by a junction 266. The numeral 260 denotes a controlled rectifier which has the cathode thereof connected to the terminal 232 by junctions 270, 264, 250 and 244; and the numeral 262 denotes a controlled rectifier which has the cathode thereof connected to the terminal 234 by junctions 274, 268, 254 and 248. The anodes of the controlled rectifiers 260 and 262 are connected together by a junction 272. Preferably, the controlled rectifiers 236, 238, 240, 242, 256, 258, 260 and 262 are silicon controlled rectifiers.

The numeral 276 denotes a transformer which has one terminal of the primary winding 278 thereof connected to the input terminal 232 by the junctions 270, 264, 250 and 244. The other terminal of that primary winding is connected to one terminal of the primary winding 306 of a transformer 304. The other terminal of the primary winding 306 is connected to one terminal of the primary winding 386 of a transformer 384. The other terminal of the primary winding 386 is connected to output terminal 336 of the control system of FIG. 3. The other output terminal of that control system is denoted by the numeral 338; and that output terminal is connected to the input terminal 234 by the junctions 274, 268, 254 and 248. A load 339 can be connected between the output terminals 336 and 338. Similarly, a resistor 398 is connected between those terminals.

The secondary winding 280 of the transformer 276 has a capacitor 282 connected between the terminals thereof. A full-wave bridge rectifier 284 has the input terminals 286 and 288 thereof connected to the terminals of the secondary winding 280; and the output terminal 290 of that full-wave bridge rectifier is connected to the junction 266 by an inductor 296, a junction 298, and an inductor 294. A diode 299 and a Zener diode 297 are connected in series with each other and in parallel with the inductor 296. The output terminal 292 of the bridge rectifier 284 is connected to the junction 272 by a junction 300. A capacitor 302 is connected between the junctions 298 and 300.

The secondary winding 308 of the transformer 304 has a capacitor 310 connected between the terminals thereof. A full-wave bridge rectifier 312 has the input terminals 314 and 316 thereof connected to the terminals of the secondary winding 308. The output terminal 318 of the bridge rectifier 312 is connected to the junction 246 by an inductor 324, a junction 334, and an inductor 322. A diode 326 and a Zener diode 328 are connected in series with each other and in parallel with the inductor 324. Output terminal 320 of the bridge rectifier 312 is connected to the junction 252 by junctions 319 and 332. A capacitor 330 is connected between the junctions 332 and 334. The bridge rectifier 284 has controlled rectifiers as the legs thereof; and, similarly, the bridge rectifier 312 has controlled rectifiers as the legs thereof. Preferably, those controlled rectifiers are silicon controlled rectifiers.

The transformer 384 has secondary windings 400, 401, 402, 403, 404 and 405. The left-hand terminal of secondary winding 400 is connected to the gate of the upper right-hand controlled rectifier of bridge rectifier 312 by a series-connected diode and resistor; and the right-hand terminal of that secondary winding is directly connected to the cathode of that controlled rectifier by the input terminal 316.

The terminals of the secondary winding 401 are connected to the input terminals 394 and 396 of a full wave bridge rectifier 390; and diodes are the legs of that bridge rectifier. A Zener diode 397 is connected between the output terminals of that bridge rectifier; and the anode of that Zener diode confronts the output terminal 392 of that bridge rectifier. The left-hand terminal of the secondary winding 401 also is connected to the gate of the lower left-hand controlled rectifier of bridge rectifier 312 by input terminal 394 and a resistor. The right-hand terminal of that secondary winding also is connected to the gate of the lower right-hand controlled rectifier of bridge rectifier 312 by input terminal 396 and a resistor. The output terminal 392 of bridge rectifier 390 is connected to the cathodes of both of the lower controlled rectifiers of bridge rectifier 312 by junction 319 and output terminal 320.

The right-hand terminal of secondary winding 402 will be connected to the gate D of the upper left-hand controlled rectifier of bridge rectifier 312 by a series-connected diode and resistor and a conductor 312D. The left-hand terminal of that secondary winding will be directly connected to the cathode of that controlled rectifier by the input terminal 314 and a conductor 314a.

The left-hand terminal of secondary winding 403 will be connected to the gate $a$ of the upper right-hand controlled rectifier of bridge rectifier 284 by a series-connected diode and resistor and a conductor 284a. The right-hand terminal of that secondary winding will be directly connected to the cathode of that controlled rectifier by the input terminal 288 and a conductor 288a.

The cathode of a diode 406 is connected to the left-hand terminal of secondary winding 404; and the cathode of a diode 408 is connected to the right-hand terminal of that secondary winding. The anodes of those diodes are connected together by a junction 407 and that junction will be connected to the cathodes of both of the lower controlled rectifiers of bridge rectifier 284 by the output terminal 292 and a conductor 292a. The left-hand terminal of the secondary winding 404 also will be connected to the gate c of the lower left-hand controlled rectifier of bridge rectifier 284 by a resistor and a conductor 284c. The right-hand terminal of that secondary winding also will be connected to the gate b of the lower right-hand controlled rectifier of bridge rectifier 284 by a resistor and a conductor 284b.

The right-hand terminal of secondary winding 405 will be connected to the gate a of the upper left-hand controlled rectifier of bridge rectifier 284 by a series-connected diode and resistor and a conductor 284d. The left-hand terminal of that secondary winding will be directly connected to the cathode of that controlled rectifier by the input terminal 286 and a conductor 286a.

The lower terminal of the primary winding 104 of a subcircuit 209, which can be identical to the subcircuit 209 of FIG. 1, is connected to the output terminal 336 of FIG. 3. The upper terminal of the resistor 113 of that subcircuit is connected to the output terminal 338.

A sub-circuit 410 in FIG. 3 is very similar to the sub-circuit 207 in FIG. 1—having a transistor 154, a unijunction transistor 168, a capacitor 162, a Zener diode 200, diodes 174, 202 and 204, and resistors 156, 166, 170, 182, 186, 188, 190 and 198 which can be identical to the similarly-numbered components of the subcircuit 207. The subcircuit 410 differs from the subcircuit 207 in having the primary winding 414 of a transformer 412 connected in parallel with the resistor 182, in having the anode of diode 202 connected to the input terminal 232 by junction 244, and in having the anode of diode 204 connected to the input terminal 234 by junction 248. The left-hand terminal of resistor 186 is connected to the gate of controlled rectifier 236, and the left-hand terminal of resistor 188 is connected to the gate of controlled rectifier 238. The junction 196 is connected to the cathodes of controlled rectifiers 236 and 238 by the junction 246; and the junction 196 also is connected to the junction 255. The upper terminal of secondary winding 416 of transformer 412 will be connected to the gate g of controlled rectifier 240 by a series-connected resistor and diode and a conductor 240g; and the lower terminal of that secondary winding will be connected to the cathode of that controlled rectifier by the junction 250 and a conductor 250a. The upper terminal of secondary winding 418 of transformer 412 will be connected to the gate g of controlled rectifier 242 by a series-connected resistor and diode and a conductor 242g; and the lower terminal of that secondary winding will be connected to the cathode of that controlled rectifier by the junction 254 and a conductor 254a.

The upper terminal of secondary winding 420 of transformer 412 will be connected to the gate g of controlled rectifier 260 by a series-connected resistor and diode and a conductor 260g; and the lower terminal of that secondary winding will be connected to the cathode of that controlled rectifier by the junction 270 and a conductor 270a. The cathode of a diode 424 is connected to the upper terminal of secondary winding 422 of transformer 412; and the cathode of a diode 426 is connected to the lower terminal of that secondary winding. The anodes of those diodes are connected together by a junction 428; and that junction will be connected to the junction 266, and hence to the cathodes of the controlled rectifiers 256 and 258 by a conductor 266a. The upper terminal of the secondary winding 422 will be connected to the gate g of controlled rectifier 256 by a resistor and a conductor 256g; and the lower terminal of that secondary winding will be connected to the gate g of controlled rectifier 258 by a resistor and a conductor 258g. The upper terminal of secondary winding 430 of transformer 412 will be connected to the gate g of controlled rectifier 262 by a series-connected resistor and diode and a conductor 262g; and the lower terminal of that secondary winding will be connected to the cathode of that controlled rectifier by the junction 274 and a conductor 274a.

The controlled rectifiers 236, 238, 240 and 242 are intended to supplant the autotransformer 24 and the controlled rectifiers 36 and 38 of FIG. 1. The inductors 322 and 324 can be identical to the inductors 60 and 62 of FIG. 1; and the capacitor 330 can be identical to the capacitor 67 of FIG. 1. The transformer 304, the capacitor 310, and the bridge rectifier 312 are intended to supplant the transformer 42, the capacitor 52, and the controlled rectifiers 54 and 56 of FIG. 1. The series-connected diode 326 and Zener diode 328 are intended to supplant the diode 64 in FIG. 1. The controlled rectifiers 256, 258, 260 and 262 are duplicates of the controlled rectifiers 236, 238, 240 and 242; and the transformer 276, the capacitor 282, and the bridge rectifier 284 are duplicates of the transformer 304, the capacitor 310, and the bridge rectifier 312. In addition, the inductors 294 and 296, the capacitor 302, the diode 299, and the Zener diode 297 are duplicates of the inductors 322 and 324, the capacitor 330, the diode 326, and the Zener diode 328.

The transformer 384 performs the functions of the transformer 70 of FIG. 1; but it has six secondary windings rather than just one secondary winding because it must fire eight, rather than just two, controlled rectifiers. The subcircuit 209 of FIG. 3 performs the functions of the similarly-numbered subcircuit of FIG. 1; and the subcircuit 410 performs the functions of the subcircuit 207 of FIG. 1. However, the sub-circuit 410 fires eight, rather than just two, controlled rectifiers.

The control system of FIG. 3 is adapted for use with large capacity loads; and it could be used with still larger capacity loads by adding further sets of controlled rectifiers 256, 258, 260 and 262, further transformers 276, further capacitors 282 and 302, further bridge rectifiers 284, further inductors 294 and 298, further diodes 299, further Zener diodes 297, and further secondary windings on the transformer 412. If it ever became desirable to use the control system of FIG. 3 with small capacity loads, the controlled rectifiers 256, 258, 260 and 262, the bridge rectifier 284, the inductors 294 and 296, the capacitors 302 and 282, the diode 299, the Zener diode 297, the transformer 276, and the secondary windings 420, 422 and 430 of transformer 412 could be eliminated.

If it is assumed that, at the moment the input terminals 232 and 234 are connected to the source 230, the voltage at the terminal 232 is positive relative to the voltage at the terminal 234, current will flow from terminal 232 via junctions 244, 250, 264 and 270, primary winding 278, primary winding 306, primary winding 386, terminal 336, load 339, terminal 338, and junctions 274, 268, 254 and 248 to the terminal 234. Current also will flow from terminal 232 via junctions 244, 250, 264 and 270, primary windings 278, 306 and 386, resistor 398, and junctions 274, 268, 254 and 248 to the terminal 234. In addition, current will flow from terminal 232 via junctions 244, 250, 264 and 270, primary windings 278, 306 and 386, the primary winding 104 of the subcircuit 209, and junctions 274, 268, 254 and 248 to the terminal 234.

The flow of current through the primary winding 386 of transformer 384 will cause secondary winding 401, secondary winding 402, secondary winding 404, and secondary winding 405 to render the lower right-hand and upper left-hand controlled rectifiers of both of the bridge rectifiers 312 and 284 conductive. The resulting flow of current from output terminal 320 of bridge rectifier 312 via junctions 319 and 332, capacitor 330, junction 334, and inductor 324 to the output terminal 318 of that bridge rectifier will be only momentary in nature, because the capicitor 330 will not pass direct current, but that flow of current will tend to charge the capacitor 330 and to make the junction 332 positive relative to the junction 334. The resulting flow of current from output terminal 292 of bridge rectifier 284 via junction 300, capacitor 302, junction 298, inductor 296, and output terminal 290 of that bridge rectifier will be only momentary in nature, because the capacitor 302 will not pass direct current, but that flow of current will tend to charge the capacitor 302 and to make the junction 300 positive relative to the junction 298. Current also will flow from terminal 232 via junction 244, diode 202 of subcircuit 410, junctions 206 and 192, resistor 198, junction 194, Zener diode 200, junctions 196, 246 and 255, resistor 257 and diode 259 to the terminal 234. In addition, current will flow from terminal 232 via junction 244, diode 202 of subcircuit 410, junctions 206 and 192, resistor 190, junction 176, diode 174, junctions 172 and 194, Zener diode 200, junctions 196, 246 and 255, resistor 257, and diode 259 to the terminal 234. Furthermore, current will flow from terminal 232 via junction 244, diode 202 of subcircuit 410, junctions 206 and 192, resistor 190, junctions 176 and 158, resistor 166, junctions 164, 184, 196, 246 and 255, resistor 257, and diode 259 to the terminal 234. Moreover, current will flow from terminal 232 via junction 244, diode 202, of subcircuit 410, junctions 206 and 192, resistor 190, junctions 176 and 158, resistor 156, transistor 154, junction 160, capacitor 162, junctions 164, 184, 196, 246 and 255, resistor 257, and diode 259 to the terminal 234; and that current will start charging that capacitor.

The flow of current through the primary winding 104 in the voltage sensing subcircuit 209 will cause the transistor 144 to conduct current at a predetermined rate; and the resulting voltage at the junction 152 will make the base of transistor 154 in subcircuit 410 positive relative to the emitter of that transistor. The resulting flow of current through the transistor 154 will charge the capacitor 162; and when that capacitor is sufficiently charged it will cause the unijunction transistor 168 to become conductive. The consequent voltage across the resistor 182 will fire the controlled rectifier 236, the secondary winding 418 will fire the controlled rectifier 242, the secondary winding 422 will fire the controlled rectifier 256, and the secondary winding 430 will fire the controlled rectifier 262. Current will then flow from the output terminal 320 of bridge rectifier 312 via junctions 319, 332 and 252, controlled rectifier 242, junctions 254 and 248, terminal 234, source 230, terminal 232, junction 244, controlled rectifier 236, junction 246, inductor 322, junction 334, and inductor 324 to the output terminal 318. That current flow will develop inductive energy in the inductor 322. Current also will flow from the output terminal 292 of bridge rectifier 284 via junctions 300 and 272, controlled rectifier 262, junctions 274, 268, 254 and 248, terminal 234, source 230, terminal 232, junctions 244, 250 and 264, controlled rectifier 256, junction 266, inductor 294, junction 298, and inductor 296 to the output terminal 290. That current flow will develop inductive energy in the inductor 294. The lower right-hand and upper left-hand controlled rectifiers of the bridge rectifiers 284 and 312 and the controlled rectifiers 236, 242, 256 and 262 will remain conductive throughout the rest of the first half cycle of the alternating current supplied to the terminals 232 and 234 by the source 230. However, at the end of that first half cycle, the current flowing through the lower right-hand and upper left-hand controlled rectifiers of the bridge rectifiers 284 and 312 will fall to zero; and, thereupon, those controlled rectifiers will become non-conductive.

During that first half cycle, substantial amounts of inductive energy were developed in the inductors 322 and 294; and, at the end of that first half cycle that energy forced current to continue to flow through those inductors. As a result, current flowed from the right-hand terminal of inductor 322 via junction 334, capacitor 330, junctions 332 and 252, controlled rectifier 242, junctions 254 and 248, terminal 234, source 230, terminal 232, junction 244, controlled rectifier 236, and junction 246 to the left-hand terminal of that inductor. That current maintained the controlled rectifiers 242 and 236 conductive even though the voltage between the terminals 232 and 234 fell to zero; and that current flow tended to charge the capacitor 330 so the junction 334 was positive relative to the junction 332. Current also flowed from the right-hand terminal of inductor 294 via junction 298, capacitor 302, junctions 300 and 272, controlled rectifier 262, junctions 274, 268, 254 and 248, terminal 234, source 230, terminal 232, junctions 244, 250 and 264, controlled rectifier 256, and junction 266 to the left-hand terminal of that inductor. That current maintained the controlled rectifiers 262 and 256 conductive even though the voltage between the terminals 232 and 234 fell to zero; and that current flow tended to charge the capacitor 302 so the junction 298 was positive relative to the junction 300.

During the next half cycle of the alternating current supplied to the terminals 232 and 234 by the source 230, the voltage at the terminal 234 will be positive relative to the voltage at the terminal 232; and current will flow from terminal 234 via junctions 248, 254, 268 and 274, terminal 338, load 339, terminal 336, primary windings 386, 306 and 278, and junctions 270, 264, 250 and 244 to the terminal 232. Current also will flow from terminal 234 via junctions 248, 254, 268 and 274, resistor 398, primary windings 386, 306 and 278, and junctions 270, 264, 250 and 244 to the terminal 232. In addition, current will flow from the terminal 234 via junctions 248, 254, 268 and 274, the primary winding 104 of the voltage-sensing subcircuit 209, primary windings 386, 306 and 278, and junctions 270, 264, 250 and 244 to the terminal 232.

The flow of current through the primary winding 386 of transformer 384 will cause secondary winding 400, secondary winding 401, secondary winding 403, and secondary winding 404 to render the lower left-hand and the upper right-hand controlled rectifiers of the bridge rectifiers 312 and 284 conductive almost immediately after the source 230 makes the voltage at the terminal 234 positive relative to the voltage at the terminal 232; and current will flow from the output terminal 320 of bridge rectifier 312 via junctions 319 and 332, capacitor 330, junction 334 and inductor 324 to the output terminal 318. That current flow will be only momentary in nature, because the capacitor 330 will not pass direct current; but that current flow will tend to charge that capacitor so the junction 332 is positive relative to the junction 334. Also current will flow from the output terminal 292 of bridge rectifier 284 via junction 300, capacitor 302, junction 298, and inductor 296 to the output terminal 290. That current flow will be only momentary in nature because the capacitor 302 will not pass direct current; but that current flow will tend to charge the capacitor 302 so the junction 300 is positive relative to the junction 298. Current also will flow from the output terminal 320 of bridge rectifier 312 via junctions 319, 332 and 252, controlled rectifier 242, junctions 254 and 248, terminal 234, source 230, terminal 232, junction 244, controlled rectifier 236, junction 246, inductor 322, junction 334, and inductor 324 to the output terminal 318. The voltage supplied by the source 230 will oppose that flow of current, but the inductor 322 acts as a voltage source and will coact with the transformer 304 to assure the said flow of current; and that flow of current will continue until the controlled rectifiers 240 and 238 are rendered conductive. Current also will flow from the output terminal 292 of bridge rectifier 284 via junctions 300 and 272, controlled rectifier 262, junctions 274, 268, 254 and 248, terminal 234, source 230, terminal 232, junctions 244, 250 and 264, controlled rectifier 256, junction 266, inductor 294, junction 298, and inductor 296 to the output terminal 290. The voltage supplied by the source 230 will oppose that flow of current, but the inductor 294 acts as a voltage source and will coact with the transformer 276 to assure the said flow of current; and that flow of current will continue until the controlled rectifiers 260 and 258 are rendered conductive.

Current will flow through the subcircuit 410, and current also will flow through the subcircuit 209; and the subcircuit 209 will render the unijunction transistor 168 conductive. As that unijunction transistor becomes conductive, the voltage across the resistor 182 will fire the controlled rectifier 238, the secondary winding 416 will fire the controlled rectifier 240, the secondary winding 422 will fire the controlled rectifier 258, and the secondary winding 420 will fire the controlled rectifier 260. Current will then flow from the output terminal 320 of bridge rectifier 312 via junctions 319, 332 and 252, controlled rectifier 240, junctions 250 and 244, terminal 232, source 230, terminal 234, junction 248, controlled rectifier 238, junction 246, inductor 322, junction 334, and inductor 324 to the output terminal 318. That flow of current will develop inductive energy in the inductor 322. Current also will flow from the output terminal 292 of bridge rectifier 284 via junctions 300 and 272, controlled rectifier 260, junctions 270, 264, 250 and 244, terminal 232, source 230, terminal 234, junctions 248, 254 and 268, controlled rectifier 258, junction 266, inductor 294, junction 298, and inductor 296 to the output terminal 290. That flow of current will develop inductive energy in the inductor 294. At this time, the negative voltage at the terminal 232, and hence at the anodes of the controlled rectifiers 236, 242, 256 and 262, and the positive voltage at the terminal 234, and hence at the cathodes of those controlled rectifiers, will tend to cause reverse current to flow in those controlled rectifiers, and will thereby render those controlled rectifiers nonconductive. The lower left-hand and upper right-hand controlled rectifiers of the bridge rectifiers 312 and 284 and the controlled rectifiers 240, 238, 260 and 258 will remain conductive throughout the rest of the second half cycle of the alternating current supplied to the terminals 232 and 234 by the source 230. However, at the end of that second half cycle the current flowing thorugh the lower left-hand and upper right-hand controlled rectifiers of the bridge rectifiers 312 and 284 will fall to zero; and, thereupon, those controlled rectifiers will become non-conductive.

During that second half cycle, additional inductive energy was developed in the inductors 322 and 294; and, at the end of that second half cycle, that energy forced current to continue to flow through those inductors. Some current flowed from the right-hand terminal of inductor 322 via junction 334, capacitor 330, junctions 332 and 252, controlled rectifier 240, junctions 250 and 244, terminal 232, source 230, terminal 234, junction 248, controlled rectifier 238, and junction 246 to the left-hand terminal of that inductor. That current maintained the controlled rectifiers 240 and 238 conductive even though the voltage between the terminals 232 and 234 fell to zero; and that current tended to charge the capacitor 330 so the junction 334 was positive relative to the junction 332. Other current flowed from the right-hand terminal of inductor 294 via junction 298, capacitor 302, junctions 300 and 272, controlled rectifier 260, junctions 270, 264, 250 and 244, terminal 232, source 230, terminal 234, junctions 248, 254 and 268, controlled rectifier 258, and junction 266 to the left-hand terminal of that inductor. That current maintained the controlled rectifiers 260 and 258 conductive even though the voltage between the terminals 232 and 234 fell to zero; and that current tended to charge the capacitor 302 so the junction 298 was positive relative to the junction 300.

During the third and all succeeding odd-numbered half cycles of the alternating current supplied to the terminals 232 and 234 by the source 230, current will flow from that source through the primary windings 278, 306 and 386 and the load 339, through those primary windings and resistor 398, and through those primary windings and the primary winding 104 of the subcircuit 209. In addition, transformer 384 will promptly render the upper left-hand and the lower right-hand controlled rectifiers of the bridge rectifiers 284 and 312 conductive; and some current will then flow from output terminal 292 of bridge rectifier 284 via junction 300, capacitor 302, junction 298, and inductor 296 to the output terminal 290 of that bridge rectifier, while other current will flow from output terminal 292 via junctions 300 and 272, controlled rectifier 260, junctions 270, 264, 250 and 244, terminal 232, source 230, terminal 234, junctions 248, 254 and 268, controlled rectifier 258, junction 266, inductor 294, junction 298, and inductor 296 to the output terminal 290. The said some current will tend to make the junction 300 positive relative to the junction 298; but that current will be of short duration. The other current will, however, continue to flow until the controlled rectifiers 262 and 256 are rendered conductive. Those controlled rectifiers will be rendered conductive when the unijunction transistor 168 fires; and thereafter current will flow from the output terminal 292 via controlled rectifier 262, source 230, controlled rectifier 256, and the inductors 294 and 296 to the output terminal 290. Also during the third and all succeeding odd-numbered half cycles of the alternating current supplied to the terminals 232 and 234 by the source 230, some current will flow from output terminal 320 of bridge rectifier 312 via junctions 319 and 332, capacitor 330, junction 334, and inductor 324 to the output terminal 318 of that bridge rectifier, while other current will flow from output terminal 320 via controlled rectifier 240, source 230, controlled rectifier 238, and inductors 322 and 324 to the output terminal 312. The said some current will tend to make the junction 332 positive relative to the junction 334; but that current will be of short duration. The other current will, however, continue to flow until the controlled rectifiers 242 and 236 are rendered conductive. Those controlled rectifiers will be rendered conductive when the unijunction transistor 168 fires; and thereafter current will flow from output terminal 320 via controlled rectifier 242, source 230, controlled rectifier 236, and inductors 322 and 324 to the output terminal 318.

At the end of the third and all succeeding odd-numbered half cycles of the alternating current supplied to the terminals 232 and 234 by the source 230, the upper left-hand and the lower right-hand controlled rectifiers of the bridge rectifiers 284 and 312 will become nonconductive. However, the inductive energy in the inductor 322 will force current to continue to flow through the controlled rectifiers 242 and 236 and thereby keep those controlled rectifiers conductive; and that current will flow from the right-hand terminal of that inductor via capacitor 330, controlled rectifier 242, source 230, and controlled rectifier 236 to the left-hand terminal of that inductor. That current will tend to make the junction 334 positive relative to the junction 332. Similarly, the inductive energy in the inductor 294 will force current to continue to flow through the controlled rectifiers 262 and 256, and thereby keep those controlled rectifiers conductive; and that current will flow from the right-hand terminal of that inductor via capacitor 302, controlled rectifier 262, source 230, and controlled rectifier 256 to the left-hand terminal of that inductor. That current will tend to make the junction 298 positive relative to the junction 300.

During the fourth and all succeeding even-numbered half cycles of the alternating current supplied to the terminals 232 and 234 by the source 230, current will flow from that source through the load 339 and the primary windings 386, 306 and 278, through the resistor 398 and those primary windings, and through the primary winding 104 of the subcircuit 209 and those primary windings. In addition, transformer 384 will promptly render the lower left-hand and upper right-hand controlled rectifiers of the bridge rectifiers 284 and 312 conductive; and some current will then flow from the output terminal 320 of the bridge rectifier 312 via junctions 319 and 332, capacitor 330, junction 334, and inductor 324 to the output terminal 318, while other current will flow from output terminal 320 via controlled rectifier 242, source 230, controlled rectifier 236, and inductors 322 and 324 to the output terminal 318. The said some current will tend to make the junction 332 positive relative to the junction 334; but that current will be of short duration. The other current will, however, continue to flow until the controlled rectifiers 240 and 238 are rendered conductive. Those controlled rectifiers will be rendered conductive when the unijunction transistor 168 fires; and thereafter current will flow from the output terminal 320 of bridge rectifier 312 via controlled rectifier 240, source 230, controlled rectifier 238, and inductors 322 and 324 to the output terminal 318. Also during the fourth and all succeeding even-numbered half cycles of the alternating current supplied to the terminals 232 and 234 by the source 230, some current will flow from the output terminal 292 of the bridge rectifier 284 via capacitor 302 and inductor 296 to the output terminal 290, while other current will flow from output terminal 292 via controlled rectifier 262, source 230, controlled rectifier 256, and inductors 294 and 296. The said some current will tend to make the junction 300 positive relative to the junction 298; but that current will be of short duration. The other current will, however, continue to flow until the controlled rectifiers 260 and 258 are rendered conductive. Those controlled rectifiers will be rendered conductive when the unijunction transistor 168 fires; and thereafter current will flow from output terminal 292 via controlled rectifier 260, source 230, controlled rectifier 258, and inductors 294 and 296 to the output terminal 290.

At the end of the fourth and all succeeding even-numbered half cycles of the alternating current supplied to the terminals 232 and 234 by the source 230, the lower left-hand and the upper right-hand controlled rectifiers of the bridge rectifiers 284 and 312 will become nonconductive. However, the inductive energy in the inductor 322 will force current to continue to flow through the controlled rectifiers 240 and 238 and thereby keep those controlled rectifiers conductive; and that current will flow from the right-hand terminal of that inductor via capacitor 330, controlled rectifier 240, source 230, and controlled rectifier 238 to the left-hand terminal of that inductor. That current will tend to make the junction 334 positive relative to the junction 332. Also, the inductive energy in the inductor 294 will force current to continue to flow through the controlled rectifiers 260 and 258, and thereby keep those controlled rectifiers conductive; and that current will flow from the right-hand terminal of that inductor via capacitor 302, controlled rectifier 260, source 230, and controlled rectifier 258 to the left-hand terminal of that inductor. That current will tend to make the junction 298 positive relative to the junction 300.

During each of the odd-numbered half cycles of the alternating current supplied to the terminals 232 and 234 by the source 230, the controlled rectifiers 236 and 256 will become conductive and will make the voltages at the junctions 246 and 266 substantially equal to the voltage at the terminal 232—and hence positive relative to the voltages at the junctions 252 and 272. The voltages at the junctions 246 and 266 will continue to be positive relative to the voltages at the junctions 252 and 272 throughout the rest of that half cycle.

At the beginning of the succeeding even-numbered half cycle of the alternating current supplied to the terminals 232 and 234 by the source 230, controlled rectifiers 242, 236, 262 and 256 will be kept conductive by the inductive energy in the inductors 322 and 294; and the controlled rectifiers 236 and 256 will continue to make the voltages at the junctions 246 and 266 substantially equal to the voltage at the terminal 232—and hence negative relative to the voltages at the junctions 252 and 272. The voltages at the junctions 246 and 266 will continue to be negative relative to the voltages at the junctions 252 and 272 until the controlled rectifiers 238, 240, 258 and 260 become conductive and the controlled rectifiers 236, 242, 256 and 262 become nonconductive.

As the controlled rectifiers 238, 240, 258 and 260 become conductive, during that succeeding even-numbered half cycle, the controlled rectifiers 238 and 258 will make the voltages at the junctions 246 and 266 substantially equal to the voltage at the terminal 234—and hence positive relative to the voltages at the junctions 252 and 272. The voltages at the junctions 246 and 266 will continue to be positive relative to the voltages at the junctions 252 and 272 throughout the rest of that half cycle.

At the beginning of the succeeding odd-numbered half cycle of the alternating current supplied to the terminals 232 and 234 by the source 230, the controlled rectifiers 240, 238, 260 and 258 will be kept conductive by the inductive energy in the inductors 322 and 294, and the controlled rectifiers 238 and 258 will continue to make the voltages at the junctions 246 and 266 substantially equal to the voltage at the terminal 234—and hence negative relative to the voltages at the junctions 252 and 272. The voltages at the junctions 246 and 266 will continue to be negative relative to the voltages at the junctions 252 and 272 until the controlled rectifiers 236, 242, 256 and 262 become conductive and the controlled rectifiers 238, 240, 258 and 260 become nonconductive.

As the controlled rectifiers 236, 242, 256 and 262 become conductive during that succeeding odd-numbered half cycle of the alternating current supplied to the terminals 232 and 234 by the source 230, the junctions 246 and 266 will again become positive relative to the junctions 252 and 272. All of this means that during each half cycle of the alternating current supplied to the terminals 232 and 234 by the source 230, the junctions 246 and 266 will alternately become positive and negative relative to the junctions 252 and 272. Whenever the junctions 246 and 266 are positive relative to the junctions 252 and 272, the capacitors 330 and 302 will tend to charge so the junction 334 is positive relative to the junction 332 and the junction 298 is positive relative to the junction 300. Conversely, whenever the junctions 246 and 266 are negative relative to the junctions 252 and 272, the capacitors 330 and 302 will tend to charge so the junction 332 is positive relative to the junction 334 and the junction 300 is positive relative to the junction 298. The magnitudes and polarities of the charges on the capacitors 330 and 302, and hence the magnitudes and polarities of the voltages developed between the junctions 334 and 332 and the junctions 298 and 300, will be functions of the positive-going volt seconds and the negative-going volt seconds supplied to those capacitors by the controlled rectifiers 236, 238, 240, 242, 256, 258, 260 and 262. Where the positive-going volt seconds substantially equal the negative-going volt seconds supplied to the capacitors 330 and 302 during each cycle, the net charges on those capacitors, and the net voltages between the junctions 334 and 332 and the junctions 298 and 300, will, effectively, be zero.

As in case of the control system of FIG. 1, the subcircuit 410 will, whenever the voltage across the load 339 of FIG. 3 is at the desired value, supply firing signals to the controlled rectifiers 236, 242, 256 and 262 at ninety degrees and will supply firing signals to the controlled rectifiers 238, 240, 258 and 260 at two hundred and seventy degrees during each cycle of the alternating current supplied to the terminals 232 and 234 by the source 230. This means that the control system of FIG. 3 will, whenever the voltage across the load 339 is at the desired value, provide waveforms comparable to the uppermost waveform in FIG. 2.

If the voltage supplied to the output terminals 336 and 338 tends to decrease, the voltage-sensing circuit 209 will make the transistor 144 thereof less conductive, and hence will make the transistor 154 of the firing subcircuit 410 more conductive. The resulting increase in the charging rate of the capacitor 162 will provide earlier-than-normal firing of controlled rectifiers 236, 242, 256 and 262 whenever the terminal 232 is positive relative to the terminal 234, and will provide earlier-than-normal firing of controlled rectifiers 238, 240, 258 and 260 whenever the terminal 234 is positive relative to the terminal 232. The resulting firing of the controlled rectifiers 236, 242, 256 and 262 before ninety degrees of each cycle of the alternating current supplied to the terminals 232 and 234 by the source 230, and the resulting firing of the controlled rectifiers 238, 240, 258 and 260 before two hundred and seventy degrees of each such cycle, will cause those controlled rectifiers to supply positive-going volt seconds to the capacitors 330 and 302 which are greater than the negative-going volt seconds which those controlled rectifiers supply to those capacitors. This means that the voltage at the terminal 334 will be positive relative to the voltage at the terminal 332, and that the voltage at the terminal 298 will be positive relative to the voltage at the terminal 300. Thereupon, the capacitors 330 and 302 will tend to act as voltage sources; and transformer 276, capacitor 282, and bridge rectifier 284 will tend to act as an inverter, and transformer 304, capacitor 310, and bridge rectifier 312 will tend to act as an inverter.

Specifically, during each odd-numbered half cycle of the alternating current supplied to the terminals 232 and 234 by the source 230, the transformer 384 and the diodes associated therewith will promptly fire the upper left-hand and lower right-hand controlled rectifiers of the bridge rectifiers 284 and 312. Current will then flow from the upper terminal of capacitor 302 via junction 298, inductor 296, output terminal 290, the upper left-hand controlled rectifier of bridge rectifier 284, input terminal 286, secondary winding 280, input terminal 288, the lower right-hand controlled rectifier of that bridge rectifier, output terminal 292, and junction 300 to the lower terminal of that capacitor; and that current flow will cause the transformer 276 to develop a voltage pulse across the primary winding 278 thereof which is generally comparable to the voltage pulse 225 in FIG. 2. Current also will flow from the lower terminal of capacitor 330 via junction 334, inductor 324, output terminal 318, the upper left-hand controlled rectifier of bridge rectifier 312, input terminal 314, secondary winding 308, input terminal 316, the lower right-hand controlled rectifier of that bridge rectifier, output terminal 320, and junction 332 to the upper terminal of that capacitor; and that current flow will cause the transformer 304 to develop a voltage pulse across the primary winding 306 thereof which is generally comparable to the voltage pulse 225 in FIG. 2.

During each even-numbered half cycle of the alternating current supplied to the terminals 232 and 234 by the source 230, the transformer 384 and the diodes associated therewith will promptly fire the upper right-hand and the lower left-hand controlled rectifiers of the bridge rectifiers 284 and 312. Current will then flow from the upper terminal of capacitor 302 via junction 298, inductor 296, output terminal 290, the upper right-hand controlled rectifier of bridge rectifier 284, input terminal 288, secondary winding 280, input terminal 286, the lower left-hand controlled rectifier of that bridge rectifier, output terminal 292, and junction 300 to the lower terminal of that capacitor; and that current flow will cause the transformer 276 to develop a voltage pulse across the primary winding 278 thereof which is generally comparable to the voltage pulse 226 in FIG. 2. Current also will flow from the lower terminal of capacitor 330 via junction 334, inductor 324, output terminal 318, the upper right-hand controlled rectifier of bridge rectifier 312, input terminal 316, secondary winding 308, input terminal 314, the lower left-hand controlled rectifier of that bridge rectifier, output terminal 320, and junction 332 to the upper terminal of that capacitor; and that current flow will cause the transformer 304 to develop a voltage pulse across the primary winding 306 thereof which is generally comparable to the voltage pulse 226 in FIG. 2.

During each odd-numbered half cycle of the alternating current supplied to the terminals 232 and 234 by the source 230, the current flowing from the upper terminal of the capacitor 302 via inductor 296, the upper left-hand controlled rectifier of bridge rectifier 284, secondary winding 280, and the lower right-hand controlled rectifier of that bridge rectifier to the lower terminal of that capacitor will charge the capacitor 282 so the left-hand terminal thereof is positive relative to the right-hand terminal thereof. As a result, when the upper right-hand and lower left-hand controlled rectifiers of bridge rectifier 284 subsequently become conductive at the start of the next-succeeding half cycle of the alternating current supplied to the terminals 232 and 234 by the source 230, the capacitor 282 will apply a positive voltage to the cathodes and will apply a negative voltage to the anodes of the upper left-hand and lower right-hand controlled rectifiers of bridge rectifier half cycle of the alternating current supplied to the tertifiers non-conductive. Similarly, during each odd-numbered half cycle of the alternating current supplied to the terminals 232 and 234 by the source 230, the current flowing from the lower terminal of the capacitor 330 via inductor 324, the upper left-hand controlled rectifier of bridge rectifier 312, secondary winding 308, and the lower right-hand controlled rectifier of that bridge rectifier to the upper terminal of that capacitor will charge the capacitor 310 so the left-hand terminal thereof is positive relative to the right-hand terminal thereof. As a result, when the upper right-hand and lower left-hand controlled rectifiers of the bridge rectifier 312 subsequently become conductive at the start of the next-succeeding half cycle of the alternating current supplied to the terminals 232 and 234 by the source 230, the capacitor 310 will apply a positive voltage to the cathodes and will apply a negative voltage to the anodes of the upper left-hand and lower right-hand controlled rectifiers of the bridge rectifier 312 and thereby promptly render those controlled rectifiers non-conductive.

During each even-numbered half cycle of the alternating current supplied to the terminals 232 and 234 by the source 230, the current flowing from the upper terminal of the capacitor 302 via inductor 296, the upper right-hand controlled rectifier of bridge rectifier 284, secondary winding 280, and the lower left-hand controlled rectifier of that bridge rectifier to the lower terminal of that capacitor will charge the capacitor 282 so the right-hand terminal thereof is positive relative to the left-hand terminal thereof. As a result, when the upper left-hand and lower right-hand controlled rectifiers of bridge rectifier 284 subsequently become conductive at the start of the next-succeeding half cycle of the alternating current supplied to the terminals 232 and 234 by the source 230, the capacitor 282 will apply a positive voltage to the cathodes and a negative voltage to the anodes of the upper right-hand and the lower left-hand controlled rectifiers of the bridge rectifier 284 and thereby promptly render those controlled rectifiers nonconductive. Similarly, during each even-numbered half cycle of the alternating current supplied to the terminals 232 and 234 by the source 230, the current flowing from the lower terminal of the capacitor 330 via inductor 324, the upper right-hand controlled rectifier of bridge rectifier 312, secondary winding 308, and the lower left-hand controlled rectifier of that bridge rectifier to the upper terminal of that capacitor will charge the capacitor 310 so the right-hand terminal thereof is positive relative to the left-hand terminal thereof. As a result, when the upper left-hand and lower right-hand controlled rectifiers of the bridge rectifier 312 subsequently become conductive at the start of the next-succeeding half cycle of the alternating current supplied to the terminals 232 and 234 by the source 230, the capacitor 310 will apply a positive voltage to the cathodes and a negative voltage to the anodes of the upper right-hand and the lower left-hand controlled rectifiers of the bridge rectifier 312 and thereby promptly render those controlled rectifiers non-conductive.

The inductors 296 and 324 will act as ballasts or chokes, and will thereby keep excessive current from flowing during the instant when the upper left-hand and lower right-hand controlled rectifiers of the bridge rectifiers 284 and 312 are being rendered conductive and the upper right-hand and lower left-hand controlled rectifiers of those bridge rectifiers are being rendered non-conductive. Similarly, those inductors will act as ballasts or chokes, and will thereby keep excessive current from flowing during the instant when the upper right-hand and lower left-hand controlled rectifiers of the bridge rectifiers 284 and 312 are being rendered conductive and the upper left-hand and lower right-hand controlled rectifiers of those bridge rectifiers are being rendered non-conductive. Those inductors will have inductive energy stored within them during the said instants, but the series-connected diode 299 and Zener diode 297 and the series-connected diode 326 and Zener diode 328 will provide discharge paths for that inductive energy. If desired, the Zener diodes 297 and 328 could be omitted, as in the case of FIG. 1. However, those Zener diodes are useful in causing a larger voltage to appear across the terminals of those inductors as those inductors dissipate the inductive energy therein.

The upper left-hand and lower right-hand controlled rectifiers of the bridge rectifiers 284 and 312 will be rendered conductive almost immediately after the start of each odd-numbered half cycle of the alternating current supplied to the terminals 232 and 234 by the source 230, and the upper right-hand and the lower left-hand controlled rectifiers of those bridge rectifiers will be rendered conductive almost immediately after the start of each even-numbered half cycle of the alternating current supplied to the terminals 232 and 234 by the source 230. Further, those controlled rectifiers will instantly become substantially fully conductive; and hence the voltage pulses developed by the capacitors 302 and 330, the bridge rectifiers 284 and 312, the capacitors 282 and 310, and the transformers 276 and 304 will essentially constitute a square wave output voltage which has the zero crossovers thereof substantially congruent with the zero crossovers of the sinusoidal current supplied by the source 230. The polarity of the square wave output voltage constituted by the said voltage pulses is such that those voltage pulses will aid the sinusoidal voltage supplied by the source 230. The magnitude of the square wave output voltage constituted by the said voltage pulses is linearly dependent upon the voltage across the capacitors 302 and 330, and is thus a function of the net volt seconds supplied to those capacitors. The overall result is that the primary windings 278 and 306 of transformers 276 and 304 superimpose corrective voltages upon the voltage supplied by the source 230; and those corrective voltages will increase the voltage across the load 339 to, and will hold that voltage at, the desired value.

If the voltage supplied by the source 230 falls even further below the desired value, each of the controlled rectifiers 236, 238, 240, 242, 256, 258, 260 and 262 will be fired even closer to the start of the appropriate half cycle of the alternating current supplied to the terminals 232 and 234 by the source 230. This means that the total of the positive-going volt seconds applied to the capacitors 302 and 330 will be even greater than the total of the negative-going volt seconds applied to those capacitors; and hence larger charges will be developed across those capacitors. The resulting larger voltages across those capacitors will increase the amplitude of the voltage pulses like the pulses 225 and 226 of FIG. 2, thereby keeping the voltage across the load 339 at the desired value. However, if the voltage supplied by the source 230 approaches the desired value, each of the controlled rectifiers 236, 238, 240, 242, 256, 258, 260 and 262 will be fired closer to the midpoint of the appropriate half cycle of the alternating current supplied to the terminals 232 and 234 by the source 230. This means that the total of the positive-going volt seconds applied to the capacitors 302 and 330 will tend to approach the total of the negative-going volt seconds applied to those capacitors; and hence smaller charges will be developed across those capacitors. The resulting smaller voltages across those capacitors will decrease the amplitude of the voltage pulses like the pulses 225 and 226 of FIG. 2, thereby keeping the voltage across the load 339 at the desired value. The overall result is that the line voltage regulator of FIG. 3 will respond to a low input voltage to develop corrective voltages and to superimpose those voltages upon that input voltage and thereby hold the output voltage at the desired value.

If the voltage supplied to the output terminals 336 and 338 tends to increase, the voltage sensing circuit 209 will make the transistor 144 thereof more conductive, and hence will make the transistor 154 of the firing subcircuit 410 less conductive. The resulting decrease in the charging rate of the capacitor 162 will provide later-than-normal firing of the unijunction transistor 168; and hence will provide later-than-normal firing of controlled rectifiers 236, 242, 256 and 262 whenever the terminal 232 is positive relative to the terminal 234, and will provide later-than-normal firing of controlled rectifiers 238, 240, 258 and 260 whenever the terminal 234 is positive relative to the terminal 232. The resulting firing of the controlled rectifiers 236, 242, 256 and 262 after ninety degrees of each cycle of the alternating current supplied to the terminals 232 and 234 by the source 230, and the resulting firing of the controlled rectifiers 238, 240, 258 and 260 after two hundred and seventy degrees of each such cycle, will cause those controlled rectifiers to supply positive-going volt seconds to the capacitors 330 and 302 which are smaller than the negative-going volt seconds which those controlled rectifiers supply to those capacitors. This means that the voltage at terminal 334 will be negative relative to the voltage at the terminal 332, and that the voltage at the terminal 298 will be negative relative to the voltage at the terminal 300. Thereupon, the capacitors 330 and 302 will tend to act as voltage sources.

During each even-numbered half cycle of the alternating current supplied to the terminals 232 and 234 by the source 230, the secondary winding 280 will charge the capacitor 282 and will make the voltage at the left-hand terminal of that capacitor positive relative to the voltage at the right-hand terminal of that capacitor. The voltage at the left-hand terminal of that capacitor will, at the start of the next-succeeding odd-numbered half cycle of the alternating current supplied to the terminals 232 and 234 by the source 230, still be positive relative to the voltage at the right-hand terminal of that capacitor; and hence the upper left-hand and lower right-hand controlled rectifiers of bridge rectifier 284 will be reverse biased at the start of that next succeeding odd-numbered half cycle. Those controlled rectifiers will be additionally reverse biased by the voltage across the capacitor 302. Similarly, during each even-numbered half cycle of the alternating current supplied to the terminals 232 and 234 by the source 230, the secondary winding 308 will charge the capacitor 310 and will make the voltage at the left-hand terminal of that capacitor positive relative to the voltage at the right-hand terminal of that capacitor. The voltage at the left-hand terminal of that capacitor will, at the start of the next-succeeding odd-numbered half cycle of the alternating current supplied to the terminals 232 and 234 by the source 230, still be positive relative to the voltage at the right-hand terminal of that capacitor; and hence the upper left-hand and lower right-hand controlled rectifiers of bridge rectifier 312 will be reverse biased at the start of that next succeeding odd-numbered half cycle. Those controlled rectifiers will be additionally reverse biased by the voltage across the capacitor 330. This means that although the transformer 384 and the diodes associated therewith will apply firing signals to the upper left-hand and lower right-hand controlled rectifiers of the bridge rectifiers 284 and 312 immediately after the start of that next-succeeding half cycle, those controlled rectifiers will not instantaneously become conductive. Instead, the current from the secondary windings 280 and 308 will, respectively, flow through the capacitors 282 and 310; and that current will promptly discharge those capacitors and then charge those capacitors so the voltages at the left-hand terminals thereof are negative relative to the voltages at the right-hand terminals thereof. As the said current causes the voltages across the capacitors 282 and 310 to reach values slightly greater than the values of the voltages across the capacitors 302 and 330, the reverse biases on the upper left-hand and lower right-hand controlled rectifiers of the bridge rectifiers 284 and 312 will disappear; and those controlled rectifiers will then respond to the continuing firing signals supplied by the transformer 384 and the diodes associated therewith to become conductive. As the voltages across the capacitors 282 and 310, and hence across the secondary windings 280 and 308, rise, the voltages across the primary windings 278 and 306 also will rise; and a voltage pulse like the voltage pulse 239 in FIG. 2 will result.

As the upper left-hand and lower right-hand controlled rectifiers of bridge rectifier 284 become conductive, current will initially flow from the right-hand terminal of secondary winding 280 via input terminal 288, the lower right-hand controlled rectifier of that bridge rectifier, output terminal 292, junctions 300 and 272, controlled rectifier 260, junctions 270, 264, 250 and 244, terminal 232, source 230, terminal 234, junctions 248, 254 and 268, controlled rectifier 258, junction 266, inductor 294, junction 298, inductor 296, output terminal 290, the upper left-hand controlled rectifier of bridge rectifier 284, and input terminal 286 to the left-hand terminal of that secondary winding; and will subsequently flow from the right-hand terminal of secondary winding 280 via input terminal 288, the lower right-hand controlled rectifier of that bridge rectifier, output terminal 292, junctions 300 and 272, controlled rectifier 262, junctions 274, 268, 254 and 248, terminal 234, source 230, terminal 232, junctions 244, 250 and 264, controlled rectifier 256, junction 266, inductor 294, junction 298, inductor 296, output terminal 290, the upper left-hand controlled rectifier of bridge rectifier 284, and input terminal 286 to the left-hand terminal of that secondary winding. The upwardly-directed ampere seconds of flow through the source 230 will exceed the downwardly-directed ampere seconds of flow through that source and will pump some power from the transformer 276 to the source 230. Similarly, as the upper left-hand and lower right-hand controlled rectifiers of the bridge rectifier 312 become conductive, current will initially flow from the right-hand terminal of secondary winding 308 via input terminal 316, the lower right-hand controlled rectifier of that bridge rectifier, output terminal 320, junctions 319, 332 and 252, controlled rcetifier 240, junctions 250 and 244, terminal 232, source 230, terminal 234, junction 248, controlled rectifier 238, junction 246, inductor 322, junction 334, inductor 324, output terminal 318, and the upper left-hand controlled rectifier of bridge rectifier 312 to the left-hand terminal of that secondary winding, and will subsequently flow from the right-hand terminal of secondary winding 308 via input terminal 316, the lower right-hand controlled rectifier of that bridge rectifier, output terminal 320, junctions 319, 332 and 252, controlled rectifier 242, junctions 254 and 248, terminal 234, source 230, terminal 232, junction 244, controlled rectifier 236, junction 246, inductor 232, junction 334, inductor 324, output terminal 318, and the upper left-hand controlled rectifier of bridge rectifier 312 to the left-hand terminal of that secondary winding. The upwardly-directed ampere seconds of flow through the source 230 will exceed the downwardly-directed ampere seconds of flow through that source and will pump some power from the transformer 304 to the source 230. This means that during each odd-numbered half cycle of the alternating current supplied to the terminals 232 and 234 by the source 230, a voltage pulse, like the pulse 239 in FIG. 2, will be developed and some power from the transformers 276 and 304 will be pumped back into the source 230.

At the end of each odd-numbered half cycle of the alternating current supplied to the terminals 232 and 234 by the source 230, the current flowing through the upper left-hand and lower right-hand controlled rectifiers of the bridge rectifiers 284 and 312 will fall to zero; and hence those controlled rectifiers will become non-conductive. During each odd-numbered half cycle of the alternating current supplied to the terminals 232 and 234 by the source 230, the secondary winding 280 will charge the capacitor 282 and will make the voltage at the right-hand terminal of that capacitor positive relative to the voltage at the left-hand terminal of that capacitor. The voltage at the right-hand terminal of that capacitor will, at the start of the next-succeeding even-numbered half cycle of the alternating current supplied to the terminals 232 and 234 by the source 230, still be positive relative to the voltage at the left-hand terminal of that capacitor; and hence the upper right-hand and lower left-hand controlled rectifiers of bridge rectifier 284 will be reverse biased at the start of that next succeeding even-numbered half cycle. Those controlled rectifiers will be additionally revere biased by the voltage across the capacitor 302. Similarly, during each odd-numbered half cycle of the alternating current supplied to the terminals 232 and 234 by the source 230, the secondary winding 308 will charge the capacitor 310 and will make the voltage at the right-hand terminal of that capacitor positive relative to the voltage at the left-hand terminal of that capacitor. The voltage at the right-hand terminal of that capacitor will, at the start of the next-succeeding even-numbered half-cycle of the alternating current supplied to the terminals 232 and 234 by the source 230, still be positive relative to the voltage at the left-hand terminal of that capacitor; and hence the upper right-hand and lower left-hand controlled rectifiers of bridge rectifier 312 will be reverse biased at the start of that next succeeding even-numbered half-cycle. Those controlled rectifiers will be additionally reverse biased by the voltage across the capacitor 330. This means that although the transformer 384 and the diodes associated therewith will apply firing signals to the upper right-hand and lower left-hand controlled rectifiers of the bridge rectifiers 284 and 312 immediately after the start of that next-succeeding half cycle, those controlled rectifiers will not instantaneously become conductive. Instead, the current from the secondary windings 280 and 308 will, respectively, flow through the capacitors 282 and 310; and that current will promptly discharge those capacitors and then charge those capacitors so the voltages at the right-hand terminals thereof are negative relative to the voltages at the left-hand terminals thereof. As the said current causes the voltage across the capacitors 282 and 310 to reach values slightly greater than the values of the voltages across the capacitors 302 and 330, the reverse biases on the upper right-hand and lower left-hand controlled rectifiers of the bridge rectifiers 284 and 312 will disappear; and those controlled rectifiers will then respond to the continuing firing signals supplied by the transformer 384 and the diodes associated therewith to become conductive. As the voltage across the capacitors 282 and 310, and hence across the secondary windings 280 and 308, rise, the voltage across the primary windings 278 and 306 also will rise; and a voltage pulse like the voltage pulse 241 in FIG. 2 will result.

As the upper right-hand and lower left-hand controlled rectifiers of the bridge rectifier 284 become conductive, current will initially flow from the left-hand terminal of secondary winding 280 via input terminal 286, the lower left-hand controlled rectifier of that bridge rectifier, output terminal 292, junctions 300 and 272, controlled rectifier 262, junctions 274, 268, 254 and 248, terminal 234, source 230, terminal 232, junctions 244, 250 and 264, controlled rectifier 256, junction 266, inductor 294, junction 298, inductor 296, output terminal 290, the upper right-hand controlled rectifier of bridge rectifier 284, and input terminal 288 to the right-hand terminal of that secondary winding; and will subsequently flow from the left-hand terminal of secondary winding 280 via input terminal 286, the lower left-hand controlled rectifier of that bridge rectifier, output terminal 292, junctions 300 and 272, controlled rectifier 260, junctions 270, 264, 250 and 244, terminal 232, source 230, terminal 234, junctions 248, 254, and 268, controlled rectifier 258, junction 266, inductor 294, junction 298, inductor 296, output terminal 290, the upper right-hand controlled rectifier of bridge rectifier 284, and input terminal 288 to the right-hand terminal of that secondary winding. The downwardly-directed ampere seconds of flow through the source 230 will exceed the upwardly-directed ampere seconds of flow through that source and will pump some power from the transformer 276 to the source 230. Similarly, as the upper right-hand and lower left-hand controlled rectifiers of the bridge rectifier 312 become conductive, current will initially flow from the left-hand terminal of secondary winding 308 via input terminal 314, the lower left-hand controlled rectifier of that bridge rectifier, output terminal 320, junctions 319, 332 and 252, controlled rectifier 242, junctions 254 and 248, terminal 234, source 230, terminal 232, junction 244, controlled rectifier 236, junction 246, inductor 322, junction 334, inductor 324, output terminal 318, and the upper right-hand controlled rectifier of bridge rectifier 312 to the right-hand terminal of that secondary winding, and will subsequently flow from the left-hand terminal of secondary winding 308 via input terminal 314, the lower left-hand controlled rectifier of that bridge rectifier, output termminal 320, junctions 319, 332 and 252, controlled rectifier 240, junctions 250 and 244, terminal 232, source 230, terminal 234, junction 248, controlled rectifier 238, junction 246, inductor 322, junction 334, inductor 324, output terminal 318, and the upper right-hand controlled rectifier of bridge rectifier 312 to the right-hand terminal of that secondary winding. The downwardly directed ampere seconds of flow through the source 230 will exceed the upwardly-directed ampere seconds of flow through that source and will pump some power from the transformer 304 to the source 230. This means that during each even-numbered half cycle of the alternating current supplied to the terminals 232 and 234 by the source 230, a voltage pulse, like the pulse 241 in FIG. 2, will be developed and some power from the transformers 276 and 304 will be pumped back into the source 230. At the end of each even-numbered half-cycle of the alternating current supplied to the terminals 232 and 234 by the source 230, the current flowing through the upper right-hand and lower left-hand controlled rectifiers of the bridge rectifiers 284 and 312 will fall to zero; and hence those controlled rectifiers will become nonconductive.

The transformers 276 and 304 will, during each half-cycle of the alternating current supplied to the terminals 232 and 234 by the source 230, promptly discharge the capacitors 282 and 310 and then promptly charge those capacitors in the opposite direction; and this means that the voltage pulses like the pulses 239 and 241 will essentially constitute a square wave output voltage which has the zero crossovers thereof substantially congruent with the zero crossovers of the sinusoidal current supplied by the source 230. The polarity of the square wave output voltage constituted by the voltage pulses 239 and 241 is such that those voltage pulses will buck sinusoidal voltage supplied by the source 230. The magnitude of the square wave output voltage constituted by the voltage pulses like the pulses 239 and 241 is dependent upon the voltage across the capacitors 302 and 330, and is thus a function of the net volt seconds supplied to those capacitors. The overall result is that the primary windings 278 and 306 superimpose corrective voltages upon the voltage supplied by the source 230; and those corrective voltages will reduce the voltage across the load 339 to, and will hold that voltage at, the desired value.

If the voltage supplied by the source 230 rises even further above the desired value, each of the controlled rectifiers 236, 238, 240, 242, 256, 258, 260 and 262 will be fired even closer to the end of the appropriate half cycle of the alternating current supplied to the terminals 232 and 234 by the source 230. This means that the total of the positive-going volt seconds applied to the capacitors 302 and 330 will be even less than the total of the negative-going volt seconds applied to those capacitors; and hence larger charges will be developed across those capacitors. The resulting larger voltages across junctions 332 and 334 and junctions 300 and 298 will cause the amplitude of voltage pulses like the pulses 239 and 241 to be increased, thereby making sure that the voltage across the load 339 remains at the desired value. However, if the voltage supplied by the source 230 approaches the desired value, each of the controlled rectifiers 236, 238, 240, 242, 256, 258, 260 and 262 will be fired even closer to the midpoint of the appropriate half cycle of the alternating current supplied to the terminals 232 and 234 by the source 230. This means that the total of the positive-going volt seconds applied to the capacitors 302 and 330 will tend to approach the total of the negative-going volt seconds applied to those capacitors; and hence smaller charges will be developed across those capacitors. The resulting smaller voltages across junctions 332 and 334 and junctions 300 and 298 will cause the amplitude of the voltage pulses like the pulses 239 and 241 to be decreased, thereby making sure that the voltage across the load 339 remains at the desired value.

It should thus be apparent that the line voltage regulator of FIG. 3 essentially permits the source 230 to apply its output voltage directly to the load 339 whenever that output voltage is at the desired value, and that the said line voltage regulator develops essentially square wave corrective voltages and superimposes those corrective voltages upon that output voltage whenever that output voltage departs from that desired value. If that ouput voltage falls below that desired value, the corrective voltages will aid that output voltage; and those corrective voltages will thereby hold the voltage across the load 339 at substantially the desired value. If the output voltage rises above the desired value, the corrective voltages will buck that output voltage; and those corrective voltages will thereby hold the voltage across the load 339 at substantially the desired value. The overall result is that the voltage across the load 339 will remain substantially constant.

Referring to FIG. 4 in detail, the numerals 346, 348 and 350 denote input terminals which can be connected to a suitable source of three-phase sinusoidal alternating current. An autotransformer is denoted generally by the numeral 352; and that autotransformer has one terminal directly connected to the input terminal 346 and has the other terminal thereof connected to the input terminal 348 by a junction 378. A second autotransformer is generally denoted by the numeral 354; and that autotransformer has one terminal thereof directly connected to the input terminal 348 and has the other terminal thereof connected to the input terminal 350 by a junction 380. A third autotransformer is generally denoted by the numeral 356; and that autotransformer has one terminal thereof directly connected to the input terminal 350 while the other terminal of that autotransformer is connected to the input terminal 346 by a junction 382. The autotransformers 352, 354 and 356 can be similar to the autotransformer 24 in FIG. 1; and they can have suitable taps, not shown, which will be appropriately connected to pairs of controlled rectifiers, such as the pair of controlled rectifiers 36 and 38 in FIG. 1. Also, those taps will be appropriately connected to the lower terminals of capacitors, such as the capacitor 67 of FIG. 1, by inductors such as the inductor 60. The confronting cathodes of the pairs of controlled rectifiers will be connected to the upper terminals of those capacitors.

The numerals 358, 364 and 368 denote the primary windings of transformers which can be similar to the transformer 42 of FIG. 1; but each of those primary windings will have fewer turns than the primary winding 44 has. The numerals 360, 362 and 366 denote the primary windings of transformers which can be identical to the transformer 70 in FIG. 1. The transformers, of which the primary windings 358, 364 and 368 are parts, will have series-connected secondary windings such as the secondary windings 46 and 48, will have capacitors such as the capacitor 52 connected across the outer terminals of those series-connected secondary windings, and will have the anodes of pairs of controlled rectifiers such as the controlled rectifiers 54 and 56 connected to the outer terminals of those series-connected secondary windings. The confronting ends of those series-connected secondary windings will be connected to the upper terminals of the capacitors which correspond to the capacitor 67 in FIG. 1; and the confronting cathodes of the pairs of controlled rectifiers will be connected to the lower terminals of those capacitors by inductors such as the inductor 62 in FIG. 1. The transformers, of which the primary windings 360, 362 and 366 are parts, will have bridge rectifiers and Zener diodes such as bridge rectifier 76 and Zener diode 87 associated with them. The latter transformers and the bridge rectifiers associated with them will fire the controlled rectifiers that are associated with the transformers of which the primary windings 358, 364 and 368 are parts.

The outer terminal of the primary winding 358 is connected to the terminal 346 by the junction 382, and the inner terminal of that primary winding is connected to one terminal of the primary winding 360. The other terminal of the primary winding 360 is connected to output terminal 377 of the control system of FIG. 4. The outer terminal of the primary winding 364 is connected to the terminal 348 by the junction 378, and the inner terminal of that primary winding is connected to one terminal of the primary winding 362. The other terminal of the primary winding 362 is connected to output terminal 379. The outer terminal of the primary winding 368 is connected to the terminal 350 by the junction 380, and the inner terminal of that primary winding is connected to one terminal of the primary winding 366. The other terminal of the primary winding 366 is connected to output terminal 381. The output terminals 377, 379 and 381 of the control system of FIG. 4 will be suitably connected to the terminals of a three-phase load, not shown.

A combination of a resistor and a detaching subcircuit is denoted by the numeral 370; and while several different combinations of resistors and detecting subcircuits could be used, the combination of resistor 98 and detecting subcircuit 209 of FIG. 1 is very useful. The terminals of the combination 370 are connected to the output terminals 377 and 379 of the control system of FIG. 4. Similar combinations 372 and 374 of resistors and detecting subcircuits also have the terminals thereof connected to the output terminals 377 and 379. A firing subcircuit, not shown, such as the firing subcircuit 207 of FIG. 1 will be associated with the combination 370, and will supply firing signals to the controlled rectifiers which are associated with the autotransformer 352. A similar firing subcircuit 207, not shown, will be associated with the combination 372, and will supply firing signals to the controlled rectifiers which are associated with the autotransformer 354. A similar firing subcircuit 207, not shown, will be associated with the combination 374, and will supply firing signals to the controlled rectifiers which are associated with the autotransformer 356.

The function and operation of the autotransformers 352, 354 and 356, of the controlled rectifiers associated with them, of the transformers of which the primary windings 358, 364 and 368 are parts, of the capacitors, controlled rectifiers and inductors associated with those transformers, of the transformers of which the primary windings 360, 362 and 366 are parts, and of the bridge rectifiers associated with the latter transformers will be substantially identical to the function and operation of the autotransformer 24, of the controlled rectifiers 36 and 38, of the transformer 42, of the capacitors 67 and 52, controlled rectifiers 54 and 56, and inductors 60 and 62, transformer 70, and bridge rectifier 76 of FIG. 1. The paralleling of the combinations 370, 372 and 374 will cause those combinations to sense only the voltages between the output terminals 377 and 379; but, where the three-phase load is a balanced load, the sensing of those voltages will suffice to enable the control system of FIG. 4 to closely regulate the three-phase A.C. voltage supplied to that load. With three phase loads that are not balanced, it will be desirable to connect one terminal of the combination 370 to the output terminal 379, to connect one terminal of the combination 372 to the output terminal 381, to connect one terminal of the combination 374 to the output terminal 377, and to connect the other terminals of those combinations together. In addition, those combinations will be suitably modified to minimize interaction between them; and, when so connected and so modified, the various combinations will enable each of the primary windings 358, 364 and 368 to develop a corrective voltage of a magnitude and polarity which will keep the voltage sensed by its associated combination at the desired value.

The control system of FIG. 3 is similar to the control system of FIG. 1, but the autotransformer 24 and the controlled rectifiers 36 and 38 have been replaced by the bridge rectifier which includes the controlled rectifiers 236, 238, 240 and 242. Also, the transformer 42 with its series-connected secondary windings 46 and 48 and the controlled rectifiers 54 and 56 have been replaced by the transformer 304 and the bridge rectifier 312. If desired, however, the bridge rectifier which includes the controlled rectifiers 236, 238, 240 and 242 could be used to replace the autotransformer 24 and the controlled rectifiers 36 and 38 of FIG. 1, while the transformer 42 and the controlled rectifiers 54 and 56 were left in the control system of FIG. 1 also, if desired, the transformer 304 and the bridge rectifier 312 of FIG. 3 could be used to replace the transformer 42 and the controlled rectifiers 54 and 56 of FIG. 1, while the autotransformer 24 and the controlled rectifiers 36 and 38 were left in the control system of FIG. 1.

In some installations it may be necessary to reduce to a minimum the harmonics in the output voltage supplied to the load 93 by the control system of FIG. 1. Such a reduction can easily be effected by connecting a capacitor and a resistor in series with each other and in parallel with the autotransformer 24 and by connecting that series-connected resistor and capacitor between that autotransformer and the input terminals 20 and 22. That series-connected resistor and capacitor will provide a path for any high frequency components that are developed within the control system of FIG. 1, and will thereby enable those high frequency components to bypass the inductance of the source 18. Also, the resistor of that series-connected resistor and capacitor will limit the accentuation of voltage at harmonics corresponding to the natural frequency of the alternating current supplied by the source 18.

Such an arrangement is particularly useful where the impedance of the source is large, and where an extremely low level of harmonics is desired in the output supplied to the load 93.

The unijunction transistor 168 and the capacitor 162 of the firing subcircuits 207 and 410 provide nonlinear relationships between the voltages across the capacitors 67, 302 and 330 and the corrective voltages developed across the primary windings 44, 278 and 306; and such relationships are entirely satisfactory in most control systems. However, if substantially linear relationships are desired between the voltages across the capacitors 67, 302 and 330 and the corrective voltages developed across the primary windings 44, 278 and 306, a different firing subcircuit would be used; and that firing subcircuit can be made from known and available components by the use of known and available techniques.

In some installations, it may be desirable to modify the voltage which is sensed by the transformer 102 in each of the sub-circuits 209 of FIGS. 1 and 3. For example it may be desirable, where the load must be remote from the control system, to modify the voltage which is sensed by the transformer 102 in each of the subcircuits 209 so the control systems will be able to compensate for line drop. Where a control system is to be connected in parallel with another control system, it may be desirable to modify the said voltage so the output voltage of the control system will have a drooping characteristic. On the other hand, it might be desirable to modify the said voltage so the output voltage of the control system would have a rising characteristic.

The voltage which is sensed by the transformer 102 in each of the subcircuits 209 can be modified in various ways, but it can be modified very easily and conveniently by adding a further secondary winding to the transformer 70, and by having that further secondary winding develop a voltage across an impedance element which is connected in series with resistor 113 and with the primary winding 104 of transformer 102. Appropriate selection of the inductive, capacitive and resistive values of that impedance element, appropriate selection of the overall impedance of that impedance element, and appropriate polarization of that impedance element will enable the output voltage of the control system to have any one of a large number of desirable characteristics.

The control systems of FIGS. 1, 3 and 4 are very desirable because they can be used with loads of any power factor. Further, because the output voltages and currents of the transformers 70, 276 and 306, and because the output voltages and currents of the transformers of which the primary windings 358, 364 and 368 are parts, will be in phase whenever those transformers and the controlled rectifiers, capacitors and inductors associated therewith act as inverters, no provision need be made for those transformers to handle reactive load power factors. The control systems of FIGS. 1, 3 and 4 also have low ratios of harmonic voltages to fundamental corrective voltages; and the controlled rectifiers of those control systems can be worked at the current levels which provide the maximum utilization of those controlled rectifiers. In addition, the control system of FIG. 1 can be used in two-phase, three-phase or polyphase systems, as desired. The power which is handled by the control elements of the control systems of FIGS. 1, 3 and 4 is at the corrective level, rather than at the full power level of the load; and hence the control elements of those control systems can be relatively small. Furthermore, the harmonics which are developed by the control systems of FIGS. 1, 3 and 4 are at the corrective level rather than at the full voltage level of the load. Moreover, the pumping action, which occurs whenever the voltage supplied by the source exceeds the desired value, is desirable because it minimizes the dissipation of power.

The controlled rectifiers 36, 38, 54, 56, 236, 238, 240, 242, 256, 258, 260 and 262 and the controlled rectifiers of the bridge rectifiers 284 and 312 are very useful and desirable electronic switches. However, thyratrons, five layer diodes, and series combinations of diodes and transistors could be used instead of those controlled rectifiers. Other electronic switches could be used instead of the said controlled rectifiers if those electronic switches were capable of remaining "off" in the presence of voltages of either polarity across their output terminals, were capable of being switched on, and were capable of subsequently being switched off.

The transformers 42, 276, 308, 358, 364 and 368 of FIGS. 1, 3 and 4 constitute convenient and useful means for superimposing corrective voltages onto the voltages supplied by the various sources of alternating current. However, those transformers are not essential; and hence they could be replaced. For example, the transformers 276 and 308 could be bodily removed from FIG. 3 and the input terminal 286 and the left-hand terminal of capacitor 282 could be connected directly to junction 270, the input terminal 316 and the right-hand terminal of capacitor 310 could be connected directly to the left-hand terminal of primary winding 386, and the input terminals 288 and 314 and the right-hand terminal of capacitor 282 and the left-hand terminal of capacitor 310 could all be connected together. Where that was done, an isolating transformer would be connected between input terminals 232 and 234 and the input terminals of the bridge rectifier which includes the controlled rectifiers 236, 238, 240 and 242 and the input terminals of the bridge rectifier which includes the controlled rectifiers 256, 258, 260 and 262. The transformer 42 could be bodily removed from FIG. 1 by adding two controlled rectifiers to the controlled rectifiers 54 and 56, and by replacing the autotransformer 24 with an isolating transformer. Whether the control systems of FIGS. 1, 3 and 4 utilize subcircuits that include transformers such as the transformers 42, 276, 304, 358, 364 and 368, utilize subcircuits that include bridge rectifiers such as the bridge rectifiers 284 and 312, or utilize subcircuits that include still different electrical components, each of those subcircuits will respond to the net D.C. voltage developed across a capacitor, such as the capacitor 67, to act as a chopper. Further, each of those subcircuits will respond to one polarity of that net D.C. voltage to provide aiding voltage pulses such as the voltage pulses 225 and 226 of FIG. 2, and will respond to the opposite polarity of that net D.C. voltage to provide bucking voltage pulses such as the voltage pulses 239 and 241 of FIG. 2.

Whereas the drawing and accompanying description have shown and described several preferred forms of control systems, it should be apparent to those skilled in the art that various changes may be made in the form of the invention without affecting the scope thereof.

What I claim is:

1. An A.C. line voltage regulator that comprises:
   (a) input terminals that are connectable to a source of alternating current,
   (b) output terminals that are connectable to an A.C. load,
   (c) a capacitor,
   (d) a variable impedance that is connected to said input terminal and that can supply positive-going volt seconds and negative-going volt seconds to said capacitor,
   (e) a transformer that has one winding thereof connected between one of said input terminals and one of said output terminals,
   (f) a second variable impedance connected intermediate a second winding of said transformer and said capacitor,
   (g) a sensing circuit that is connected to said output terminals and that can respond to changes in the voltage across said terminals to cause the first said variable impedance to change the proportion of positive-going volt seconds and negative-going volt seconds,
(h) said transformer and said second variable impedance responding to a charge of predetermined polarity across said capacitor to act as an inverter and to develop voltage pulses in said one winding of said transformer that will buck the voltage supplied to said input terminals by said source of alternating current, and thereby hold the voltage across said output terminals substantially constant,
(i) said transformer and said second variable impedance responding to a charge of opposite polarity across said capacitor to develop voltage pulses in said one winding of said transformer that will aid the voltage supplied to said input terminals by said source of alternating current, and thereby maintain the voltage at said output terminals substantially constant,
(j) said source of alternating current essentially supplying sinusoidal alternating current,
(k) the first said variable impedance including a plurality of controlled rectifiers that form a bridge rectifier,
(l) said second variable impedance including a plurality of controlled rectifiers that form a bridge rectifier,
(m) a second transformer that has one winding thereof connected between one of said input terminals and one of said output terminals and that supplies firing signals to said controlled rectifiers included in said second variable impedance, and
(n) a firing circuit that supplies firing signals to said controlled rectifiers included in the first said variable impedance,
(o) said firing circuit responding to said sensing circuit to change the firing angles of said controlled rectifiers included in the first said virable impedance and thereby change the ratio of positive-going volt seconds and negative-going volt seconds supplied to said capacitor,
(p) the first said variable impedance also including an inductor that is sufficiently large to keep current flowing through it and through said controlled rectifiers included in the first said variable impedance as long as said input terminals are connected to said source of alternating current,
(q) said second variable impedance causing current to flow through said controlled rectifiers included in the first said variable impedance,
(r) said second variable impedance causing current to flow through said source of alternating current whenever said charge of predetermined polarity exists across said capacitor,
(s) said second transformer supplying firing signals to said controlled rectifiers included in said second variable impedance immediately after the start of each half cycle of said sinusoidal alternating current.

2. An A.C. line voltage regulator that comprises:
(a) input terminals that are connectable to a source of alternating current,
(b) output terminals that are connectable to an A.C. load,
(c) a capacitor,
(d) a variable impedance that is connected to said input terminal and that can supply positive-going volt seconds and negative-going volt seconds to said capacitor,
(e) a transformer that has one winding thereof connected between one of said input terminals and one of said output terminals,
(f) a second variable impedance connected intermediate a second winding of said transformer and said capacitor,
(g) a sensing circuit that is connected to said output terminals and that can respond to changes in the voltage across said terminals to cause the first said variable impedance to change the proportion of positive-going volt seconds and negative-going volt seconds,
(h) said transformer and said second variable impedance responding to a charge of predetermined polarity across said capacitor to act as an inverter and to develop voltage pulses in said one winding of said transformer that will buck the voltage supplied to said input terminals by said source of alternating current, and thereby hold the voltage across said output terminals substantially constant,
(i) said transformer and said second variable impedance responding to a charge of opposite polarity across said capacitor to develop voltage pulses in said one winding of said transformer that will aid the voltage supplied to said input terminals by said source of alternating current, and thereby maintain the voltage at said output terminals substantially constant,
(j) the first said variable impedance including a plurality of controlled rectifiers that form a bridge rectifier,
(k) said second variable impedance including a plurality of controlled rectifiers that form a bridge rectifier,
(l) a second transformer that has one winding thereof connected between one of said input terminals and one of said output terminals and that supplies firing signals to said controlled rectifiers included in said second variable impedance, and
(m) a firing circuit that supplies firing signals to said controlled rectifiers in the first said variable impedance,
(n) said firing circuit responding to said sensing circuit to change the firing angles of said controlled rectifiers included in the first said variable impedance and thereby change the ratio of positive-going volt seconds and negative-going volt seconds supplied to said capacitor,
(o) the first said variable impedance also including an inductor that is sufficiently large to keep current flowing through it and through said controlled rectifiers included in the first said variable impedance as long as said input terminals are connected to said source of alternating current,
(p) said second variable impedance causing current to flow through said controlled rectifiers included in the first said variable impedance.

3. An A.C. line voltage regulator that comprises:
(a) input terminals that are connectable to a source of alternating current,
(b) output terminals that are connectable to an A.C. load,
(c) a capacitor,
(d) a variable impedance that is connected to said input terminal and that can supply positive-going volt seconds and negative-going volt seconds to said capacitor,
(e) a transformer that has one winding thereof connected between one of said input terminals and one of said output terminals,
(f) a second variable impedance connected intermediate a second winding of said transformer and said capacitor,
(g) a sensing circuit that is connected to said output terminals and that can respond to changes in the voltage across said terminals to cause the first said variable impedance to change the proportion of positive-going volt seconds and negative-going volt seconds,
(h) said transformer and said second variable impedance responding to a charge of predetermined polarity across said capacitor to act as an inverter and to develop voltage pulses in said one winding of said transformer that will buck the voltage supplied to said input terminals by said source of alternating current, and thereby hold the voltage across said output terminals substantially constant, (i) said transformer and said second variable impedance responding to a charge of opposite polarity across said capacitor to develop voltage pulses in said one winding of said transformer that will aid the voltage supplied to said input terminals by said source of alternating current, and thereby maintain the voltage at said output terminals substantially constant, (j) the first said variable impedance including a plurality of controlled rectifiers that form a bridge rectifier, (k) said second variable impedance including a plurality of controlled rectifiers that form a bridge rectifier, and (l) a firing circuit that supplies firing signals to said controlled rectifiers included in the first said variable impedance, (m) said firing circuit responding to said sensing circuit to change the firing angles of said controlled rectifiers included in the first said variable impedance and thereby change the ratio of positive-going volt seconds and negative-going volt seconds supplied to said capacitor, (n) the first said variable impedance also including an inductor that is sufficiently large to keep current flowing through it and through said controlled rectifiers included in the first said variable impedance as long as said input terminals are connected to said source of alternating current.

4. An A.C. line voltage regulator that comprises:
(a) input terminals that are connectable to a source of alternating current,
(b) output terminals that are connectable to an A.C. load,
(c) a capacitor,
(d) a variable impedance that is connected to said input terminal and that can supply positive-going volt seconds and negative-going volt seconds to said capacitor,
(e) a transformer that has one winding thereof connected between one of said input terminals and one of said output terminals,
(f) a second variable impedance connected intermediate a second winding of said transformer and said capacitor,
(g) a sensing circuit that is connected to said output terminals and that can respond to changes in the voltage across said terminals to cause the first said variable impedance to change the proportion of positive-going volt seconds and negative-going volt seconds,
(h) said transformer and said second variable impedance responding to a charge of predetermined polarity across said capacitor to act as an inverter and to develop voltage pulses in said one winding of said transformer that will buck the voltage supplied to said input terminals by said source of alternating current, and thereby hold the voltage across said output terminals substantially constant,
(i) said transformer and said second variable impedance responding to a charge of opposite polarity across said capacitor to develop voltage pulses in said one winding of said transformer that will aid the voltage supplied to said input terminals by said source of alternating current and thereby maintain the voltage at said output terminals substantially constant,
(j) the first said variable impedance including a plurality of controlled rectifiers that form a bridge rectifier,
(k) said second variable impedance including a plurality of controlled rectifiers that form a bridge rectifier,
(l) a firing circuit that supplies firing signals to said controlled rectifiers included in the first said variable impedance.

5. An A.C. line voltage regulator that comprises:
(a) input terminals that are connectable to a source of alternating current,
(b) output terminals that are connectable to an A.C. load,
(c) a capacitor,
(d) a variable impedance that is connected to said input terminal and that can supply positive-going volt seconds and negative-going volt seconds to said capacitor,
(e) a transformer that has one winding thereof connected between one of said input terminals and one of said output terminals,
(f) a second variable impedance connected intermediate a second winding of said transformer and said capacitor,
(g) a sensing circuit that is connected to said output terminals and that can respond to changes in the voltage across said terminals to cause the first said variable impedance to change the proportion of positive going volt seconds and negative-going volt seconds,
(h) said transformer and said second variable impedance responding to a charge of predetermined polarity across said capacitor to act as an inverter and to develop voltage pulses in said one winding of said transformer that will buck the voltage supplied to said input terminals by said source of alternating current, and thereby hold the voltage across said output terminals substantially constant,
(i) said transformer and said second variable impedance responding to a charge of opposite polarity across said capacitor to develop voltage pulses in said one winding of said transformer that will aid the voltage supplied to said input terminals by said source of alternating current, and thereby maintain the voltage at said output terminals substantially constant,
(j) the first said variable impedance including a plurality of controlled rectifiers and a transformer,
(k) said second variable impedance including a plurality of controlled rectifiers and a transformer,
(l) a second transformer that has one winding thereof connected between one of said input terminals and one of said output terminals and that supplies firing signals to said controlled rectifiers included in said second variable impedance, and
(m) a firing circuit that supplies firing signals to said controlled rectifiers included in the first said variable impedance,
(n) said firing circuit responding to said sensing circuit to change the firing angles of said controlled rectifiers included in the first said variable impedance and thereby change the ratio of positive-going volt seconds and negative-going volt seconds supplied to said capacitor,
(o) the first said variable impedance also including an inductor that is sufficiently large to keep current flowing through it and through said controlled rectifiers included in the first said variable impedance as long as said input terminals are connected to said source of alternating current,
(p) said second variable impedance causing current to flow through said controlled rectifiers included in the first variable impedance.
(q) said second variable impedance causing current to flow through said source of alternating current whenever said charge of predetermined polarity exists across said capacitor, (r) said second tranformer supplying firing signals to said controlled rectifiers included in said second variable impedance immediately after the start of each half cycle of said sinusoidal alternating current.

6. An A.C. line voltage regulator that comprises:
(a) input terminals that are connectable to a source of alternating current,
(b) output terminals that are connectable to an A.C. load,
(c) a capacitor,
(d) a variable impedance that is connected to said input terminals and that can supply positive-going volt seconds and negative-going volt seconds to said capacitor,
(e) a transformer that has one winding thereof connected between one of said input terminals and one of said output terminals,
(f) a second variable impedance connected intermediate a second winding of said transformer and said capacitor,
(g) a sensing circuit that is connected to said output terminals and that can respond to changes in the voltage across said terminals to cause the first said variable impedance to change the proportion of positive-going volt seconds and negative-going volt seconds,
(h) said transformer and said second variable impedance responding to a charge of predetermined polarity across said capacitor to act as an inverter and to develop voltage pulses in said one winding of said transformer that will buck the voltage supplied to said input terminals by said source of alternating current, and thereby hold the voltage across said output terminals substantially constant,
(i) said transformer and said second variable impedance responding to a charge of opposite polarity across said capacitor to develop voltage pulses in said one winding of said transformer that will aid the voltage supplied to said input terminals by said source of alternating current, and thereby maintain the voltage at said output terminals substantially constant,
(j) the first said variable impedance including a plurality of controlled rectifiers and a transformer,
(k) said second variable impedance including a plurality of controlled rectifiers and a transformer,
(l) a second transformer that has one winding thereof connected between one of said input terminals and one of said output terminals and that supplies firing signals to said controlled rectifiers included in said second variable impedance, and
(m) a firing circuit that supplies firing signals to said controlled rectifiers included in the first said variable impedance,
(n) said firing circuit responding to said sensing circuit to change the firing angles of said controlled rectifiers included in the first said variable impedance and thereby change the ratio of positive-going volt-seconds and negative-going volt seconds supplied to said capacitor,
(o) the first said variable impedance also including an inductor that is sufficiently large to keep current flowing through it and through said controlled rectifiers included in the first said variable impedance as long as said input terminals are connected to said source of alternating current,
(p) said second variable impedance causing current to flow through said controlled rectifiers included in the first said variable impedance.

7. An A.C. line voltage regulator that comprises:
(a) input terminals that are connectable to a source of alternating current,
(b) output terminals that are connectable to an A.C. load,
(c) a capacitor,
(d) a variable impedance that is connected to said input terminal and that can supply positive-going volt seconds and negative-going volt seconds to said capacitor,
(e) a transformer that has one winding thereof connected between one of said input terminals and one of said output terminals,
(f) a second variable impedance connected intermediate a second winding of said transformer and said capacitor,
(g) a sensing circuit that is connected to said output terminals and that can respond to changes in the voltage across said terminals to cause the first said variable impedance to change the proporation of positive-going volt seconds and negative-going volt seconds,
(h) said transformer and said second variable impedance responding to a charge of predetermined polarity across said capacitor to act as an inverter and to develop voltage pulses in said one winding of said transformer that will buck the voltage supplied to said input terminals by said source of alternating current, and thereby hold the voltage across said output terminals substantially constant,
(i) said transformer and said second variable impedance responding to a charge of opposite polarity across said capacitor to develop voltage pulses in said one winding of said transformer that will aid the voltage supplied to said input terminals by said source of alternating current, and thereby maintain the voltage at said output terminals substantially constant,
(j) the first said variable impedance including a plurality of controlled rectifiers and a transformer,
(k) said second variable impedance including a plurality of controlled rectifiers and a transformer,
(l) a firing circuit that supplies firing signals to said controlled rectifiers included in the first said variable impedance,
(m) said firing circuit responding to said sensing circuit to change the firing angles of said controlled rectifiers included in the first said variable impedance and thereby change the ratio of positive-going volt seconds and negative-going volt seconds supplied to said capacitor,
(n) the first said variable impedance also including an inductor that is sufficiently large to keep current flowing through it and through said controlled rectifiers included in the first said variable impedance as long as said input terminals are connected to said source of alternating current.

8. An A.C. line voltage regulator that comprises:
(a) input terminals that are connectable to a source of alternating current,
(b) output terminals that are connectable to an A.C. load,
(c) a capacitor,
(d) a variable impedance that is connected to said input terminals and that can supply positive-going volt seconds and negative-going volt seconds to said capacitor,
(e) a transformer that has one winding thereof connected between one of said input terminals and one of said output terminals,
(f) a second variable impedance connected intermediate a second winding of said transformer and said capacitor,
(g) a sensing circuit that is connected to said output terminals and that can respond to changes in the voltage across said terminals to cause the first said variable impedance to change the proportion of positive-going volt seconds and negative-going volt seconds,
(h) said transformer and said second variable impedance responding to a charge of predetermined polarity across said capacitor to act as an inverter and to develop voltage pulses in said one winding of said transformer that will buck the voltage supplied to said input terminals by said source of alternating current, and thereby hold the voltage across said output terminals substantially constant, (i) said transformer and said second variable impedance responding to a charge of opposite polarity across said capacitor to develop voltage pulses in said one winding of said transformer that will aid the voltage supplied to said input terminals by said source of alternating current, and thereby maintain the voltage at said output terminals substantially constant, (j) the first said variable impedance including a plurality of controlled rectifiers and a transformer, (k) said second variable imepdance including a plurality of controlled rectifiers and a transformer, and (l) a firing circuit that supplies firing signals to said controlled rectifiers included in the first said variable impedance.

9. An A.C. line voltage regulator that comprises:
(a) input terminals that are connectable to a source of alternating current,
(b) output terminals that are connectable to an A.C. load,
(c) a capacitor,
(d) a variable impedance that is connected to said input terminal and that can supply positive-going volt seconds and negative-going volt seconds to said capacitor,
(e) a transformer that has one winding thereof connected between one of said input terminals and one of said output terminals,
(f) a second variable impedance connected intermediate a second winding of said transformer and said capacitor, and
(g) a sensing circuit that is connected to said output terminals and that can respond to changes in the voltage across said terminals to cause the first said variable impedance to change the proportion of positive-going volts seconds and negative-going volts seconds,
(h) said transformer and said second variable impedance responding to a charge of predetermined polarity across said capacitor to act as an inverter and to develop voltage pulses in said one winding of said transformer that will buck the voltage supplied to said input terminals by said source of alternating current, and thereby hold the voltage across said output terminals substantially constant,
(i) said transformer and said second variable impedance responding to a charge of opposite polarity across said capacitor to develop voltage pulses in said one winding of said transformer that will aid the voltage supplied to said input terminals by said source of alternating current, and thereby maintain the voltage at said output terminals substantially constant.

10. An A.C. line voltage regulator that comprises:
(a) input terminals that are connectable to a source of alternating current,
(b) output terminals that are connectable to an A.C. load,
(c) a capacitor,
(d) a variable impedance that is connected to said input terminals and that can supply positive-going volts seconds and negative-going volts seconds to said capacitor,
(e) transformer that has one winding thereof connected between one of said input terminals and one of said output terminals,
(f) a second variable impedance connected intermediate a second winding of said transformer and said capacitor, and
(g) a sensing circuit that is connected to said output terminals and that can cause the first said variable impedance to change the proportion of positive-going volt seconds and negative-going volts seconds,
(h) said transformer and said second variable impedance responding to a charge of predetermined polarity across said capacitor to develop voltage pulses in said one winding of said transformer that will buck the voltage supplied to said input terminals by said source of alternating current, and thereby hold the voltage across said output terminals substantially constant,
(i) said transformer and said second variable impedance responding to a charge of opposite polarity across said capacitor to develop aiding voltage pulses.

11. An A.C. voltage regulator that comprises:
(a) input terminals that are connectable to a source of alternating current,
(b) output terminals that are connectable to an A.C. load,
(c) a capacitor,
(d) a variable impedance that is connected to said input terminals and that can supply positive-going volt seconds and negative-going volt seconds to said capacitor,
(e) a transformer that has one winding thereof connected between one of said input terminals and one of said output terminals,
(f) a second variable impedance connected intermediate a second winding of said transformer and said capacitor, and
(g) a sensing circuit that is connected to said output terminals and that can cause the first said variable impedance to change the proportion of positive-going volt seconds and negative-going volt seconds,
(h) said transformer and said second variable impedance responding to a charge of predetermined polarity across said capacitor to develop voltage pulses in said one winding of said transformer that will buck the voltage supplied to said input terminals by said source of alternating current, and thereby hold the voltage across said output terminals substantially constant,
(i) said transformer and said second variable impedance responding to a charge of opposite polarity across said capacitor to develop aiding voltage pulses,
(j) the first said variable impedance including electronic switches,
(k) said second variable impedance including electronic switches.

12. A regulator for alternating current that comprises:
(a) input terminals that can be connected to a source of alternating current,
(b) output terminals that can be connected to an A.C. load, and
(c) a control circuit that is coupled between one of said input terminals and one of said output terminals,
(d) said control circuit acting, whenever the output level of said source is substantially at a predetermined value, to permit said sources of alternating current to essentially supply its output directly to said output terminals via said input terminals,
(e) said control circuit acting, whenever the output level of said source is agove said predetermined value, to develop a bucking correction for said output and to couple that aiding correction to said output in series-aiding relation,
(f) said control circuit acting, whenever the output level of said source is above said predetermined value, to develop a bucking correction for said output and to couple that bucking correction to said output in series-bucking relation,
(g) said control circuit including an element that can have a D.C. voltage developed across it,
(h) said control circuit including a subcircuit that can respond to said D.C. voltage across said member to act as a chopper and thereby develop said aiding correction or said bucking correction,
(i) said element of said control circuit being a capacitor,
(j) said subcircuit of said control circuit including a variable impedance,
(k) said control circuit also being coupled to said input terminals,
(l) said control circuit including a second variable impedance that can apply positive-going and negative-going volt seconds to said capacitor.

13. A regulator for alternating current that comprises:
(a) input terminals that can be connected to a source of alternating current,
(b) output terminals that can be connected to an A.C. load, and
(c) a control circuit that coupled between one of said input terminals and one of said output terminals,
(d) said control circuit acting, whenever the output level of said source is substantially at a predetermined value, to permit said source of alternating current to essentially supply its output directly to said output terminals via said input terminals,
(e) said control circuit acting, whenever the output level of said source is below said predetermined value, to develop an aiding correction for said output and to couple that aiding correction to said output in series-aiding relation,
(f) said control circuit acting, whenever the output level of said source is above said predetermined value, to develop a bucking corrction for said output and to couple that bucking correction to said output in series-bucking relation,
(g) said control circuit including an element that can have a D.C. voltage developed across it,
(h) said control circuit including a subcircuit that can respond to said D.C. voltage across said member to act as a chopper and thereby develop said aiding correction or said bucking correction,
(i) said element of said control circuit being a capacitor,
(j) said control circuit subcircuit including electronic switches.

14. An A.C. line voltage regulator that comprises:
(a) input terminals that are connectable to a source of alternating current,
(b) output terminals that are connectable to an A.C. load,
(c) a transformer that has one winding thereof connected between one of said input terminals and one of said output terminals,
(d) a control circuit that is connected to a second winding of said transformer and that can cause said transformer to develop a voltage across said one winding thereof which will aid or buck the voltage supplied to said input terminals by said source of alternating current, and
(e) a sensing circuit than can cause said control circuit to cause said transformer to develop an aiding voltage across said one winding thereof whenever the voltage supplied to said input terminals by said source of alternating current is too low and to cause said transformer to develop a bucking voltage across said one winding thereof whenever the voltage supplied to said input terminals by said sources of alternating current is too high,
(f) said source of alternating current essentially supplying its voltage directly to said output terminals and said transformer causing said one winding thereof to develop a corrective voltage and to superimpose said corrective voltage upon said voltage supplied by said source of alternating current to maintain the voltage across said output terminals substantially constant,
(g) said control circuit establishing a D.C. reference voltage,
(h) said control circuit including a capacitor, controlled rectfiers that are connected to said capacitor, and a variable impedance that is connected to said capacitor and to said second winding of said transformer,
(i) said controlled rectifiers selectively connecting the terminals of said capacitor to said input terminals to apply positive-going and negative-going volt seconds to said capacitor and thereby develop said D.C. reference voltage,
(j) said control circuit also including an inductor which is connected to said controlled rectfiers and which has current flowing through it continuously during the operation of said regulator, and which can thereby keep said controlled rectifiers conductive past the ends of half cycles of the alternating current supplied by said source of alternating current,
(k) said variable impedance including controlled rectifiers,
(l) said variable impedance responding to said D.C. reference voltage, whenever said D.C. reference voltage has a predetermined polarity, to develop said aiding voltage across said one winding of said transformer,
(m) said variable impedance repsonding to said D.C. reference voltage, whenever said D.C. reference volage has the opposite polarity, to develop said bucking voltage across said one winding of said transformer.

15. An A.C. line voltage regulator that comprises:
(a) input terminals that are connectable to a source of alternating current,
(b) output terminals that are connectable to an A.C. load,
(c) a transformer that has one winding thereof connected between one of said input terminals and one output terminals,
(d) a control circuit that is connected to a second winding of said transformer and that can cause said transformer to develop a voltage across said one winding thereof which will aid or buck the voltage supplied to said input terminals by said source of alternating current, and
(e) a sensing circuit that can cause said control circuit to cause said transformer to develop an aiding voltage across said one winding thereof whenever the voltage supplied to said input terminals by said source of alternating current is too low and to cause said transformer to develop a bucking voltage across said one winding thereof whenever the voltage supplied to said input terminals by said source of alternating current is to high,
(f) said source of alternating current essentially supplying its voltage directly to said output terminals and said transformer causing said one winding thereof to develop a corrective voltage and to superimpose said corrective voltage upon said voltage supplied by said source of alternating current to maintain the voltage across said output terminals substantially constant,
(g) said control circuit establishing a D.C. reference voltage,
(h) said control circuit including a capacitor, a variable impedance that is connected to said input terminals and to said capacitor, and a second variable impedance that is connected to said capacitor and to said second winding of said transformer.
(i) the first said variable impedance selectively connecting the terminals of said capacitor to said input terminals to apply positive-going and negative-going volt seconds to said capacitor and thereby develop said D.C. reference voltage, (j) said second variable impedance being capable of responding to said D.C. reference voltage to act as a chopper.

16. A regulator for alternating current that comprises:
    (a) input terminals that can be connected to a source of alternating current,
    (b) output terminals that can be connected to an A.C. load, and
    (c) a control circuit that is coupled between one of said input terminals and one of said output terminals,
    (d) said control circuit acting, whenever the output level of said source is substantially at a predetermined value, to permit said source of alternating current to supply its output, without material modification of the value thereof, to said output terminals via said input terminals,
    (e) said control circuit acting, whenever the output level of said source is below said predetermined value, to develop an aiding correction for said output and to couple that aiding correction to said output in series-aiding relation,
    (f) said control circuit acting, whenever the output level of said source is above said predetermined value, to develop a bucking correction for said output and to couple that bucking correction to said output in series-bucking relation,
    (g) said control circuit including an element that can have a D.C. voltage developed across it,
    (h) said control circuit including a subcircuit that can respond to said D.C. voltage across said member to act as a chopper and thereby develop said aiding correction or said bucking correction,
    (i) said element of said control circuit being a capacitor,
    (j) said control circuit subcircuit including electronic switches,
    (k) said control circuit including a further subcircuit that has further electronic switches,
    (l) said further electronic switches being adapted to supply positive-going volt seconds and negative-going volt seconds to said capacitor.

17. A regulator for alternating current that comprises:
    (a) input terminals that can be connected to a source of alternating current,
    (b) output terminals that can be connected to an A.C. load, and
    (c) a control circuit that is coupled between one of said input terminals and one of said output terminals,
    (d) said control circuit acting, whenever the output level of said source is substantially at a predetermined value, to permit said source of alternating current to supply its output, without material modification of the value thereof, to said output terminals via said input terminals,
    (e) said control circuit acting, whenever the output level of said source is below said predetermined value, to develop an aiding correction for said output and to couple that aiding correction to said output in series-aiding relation,
    (f) said control circuit acting, whenever the output level of said source is above said predetermined value, to develop a bucking correction for said output and to couple that bucking correction to said output in series-bucking relation,
    (g) said control circuit including an element that can have a D.C. voltage developed across it,
    (h) said control circuit including a subcircuit that can respond to said D.C. voltage across said member to act as a chopper and thereby develop said aiding correction or said bucking correction,
    (i) said element of said control circuit being a capacitor,
    (j) said control circuit subcircuit including electronic switches,
    (k) said control circuit including a further subcircuit that has further electronic switches,
    (l) said further electronic switches being capable of becoming conductive at different firing angles,
    (m) said further electronic switches being adapted to supply positive-going volt seconds and negative-going volt seconds to said capacitor, and
    (n) means responsive to changes in the value of the A.C. supplied to said output terminals to vary the firing angles of said further electronic switches and thereby vary the polarity of the voltage across said capacitor.

18. A regulator for alternating current that comprises:
    (a) input terminals that can be connected to a source of alternating current,
    (b) output terminals that can be connected to an A.C. load, and
    (c) a control circuit that is coupled between one of said input terminals and one of said output terminals,
    (d) said control circuit acting, whenever the output level of said source is substantailly at a predetermined value, to permit said source of alternating current to supply its output, without material modification of the value thereof, to said output terminals via said input terminals,
    (e) said control circuit acting, whenever the output level of said source is below said predetermined value, to develop an aiding correction for said output and to couple that aiding correction to said output in series-aiding relation,
    (f) said control circuit acting, whenever the output level of said source is above said predetermined value, to develop a bucking correction for said output and to couple that bucking correction to said output in series-bucking relation,
    (g) said control circuit including an element that can have a D.C. voltage developed across it,
    (h) said control circuit including a subcircuit that can respond to said D.C. voltage across said member to act as a chopper and thereby develop said aiding correction or said bucking correction,
    (i) said element of said control circuit being a capacitor,
    (j) said control circuit subcircuit including electronic switches,
    (k) said control circuit including a second subcircuit that can control the D.C. voltage across said capacitor,
    (l) the first said subcircuit of said control circuit responding to said D.C. voltage across said capacitor to develop an A.C. voltage and to superimpose that A.C. voltage upon an A.C. voltage from said source of alternating current.

19. A regulator for alternating current that comprises:
    (a) input terminals tht can be connected to a source of alternating current,
    (b) output terminals that can be connected to an A.C. load, and
    (c) a control circuit that is coupled between one of said input terminals and one of said output terminals,
    (d) said control circuit acting, whenever the output level of said source is substantially at a predetermined value, to permit said source of alternating current to supply its output, without material modification of the value thereof, to said output terminals via said input terminals,
    (e) said control circuit acting, whenever the output level of said source is below said predetermined value, to develop an aiding correction for said output and to couple that aiding correction to said output in series-aiding relation,
    (f) said control circuit acting, whenever the output level of said source is above said predetermined value, to develop a bucking correction for said output and to couple that bucking correction to said output in series-bucking relation, (g) said control circuit including an element that can have a D.C. voltage developed across it, (h) said control circuit including a subcircuit that can respond to said D.C. voltage across said member to act as a chopper and thereby develop said aiding correction or said bucking correction, (i) said element of said control circuit being a capacitor, (j) said control circuit subcircuit including electronic switches, (k) said control circuit including a second subcircuit that can control the D.C. voltage across said capacitor, (l) said second subcircuit of said control circuit including a variable impedance that can vary the magnitude of said D.C. voltage across said capacitor.

20. A regulator for alternating current that comprises:

(a) input terminals that can be connected to a source of alternating current, (b) output terminals that can be connected to an A.C. load, and (c) a control circuit that is coupled between one of said input terminals and one of said output terminals, (d) said control circuit acting, whenever the output level of said source is substantially at a predetermined value, to permit said source of alternating current to supply its output, without material modification of the value thereof, to said output terminals via said input terminals, (e) said control circuit acting, whenever the output level of said source is below said predetermined value, to develop an aiding correction for said output and to couple that aiding correction to said output in series-aiding relation, (f) said control circuit acting, whenever the output level of said source is above said predetermined value, to develop a bucking correction for said output and to couple that bucking correction to said output in series-bucking relation, (g) said control circuit including an element that can have a D.C. voltage developed across it, (h) said control circuit including a subcircuit that can respond to said D.C. voltage across said member to act as a chopper and thereby develop said aiding correction or said bucking correction, (i) said element of said control circuit being a capacitor, (j) said control circuit subcircuit including electronic switches, (k) said subcircuit of said control circuit responding to said D.C. voltage across said capacitor to develop an A.C. voltage and to superimpose that A.C. voltage upon an A.C. voltage from said source of alternating current, (l) said superimposed A.C. voltage aiding said A.C. voltage from said source of alternating current whenever the latter A.C. voltage is too low, (m) said superimposed A.C. voltage bucking said A.C. voltage from said source of alternating current whenever the latter A.C. voltage is too high, (n) whereby said superimposed A.C. voltage and said A.C. voltage from said source of alternating current can coact to provide a substantially constant A.C. output voltage.

21. A regulator for alternating current that comprises:

(a) input terminals that can be connected to a source of alternating current, (b) output terminals that can be connected to an A.C. load, and (c) a control circuit tht is coupled between one of said input terminals and one of said output terminals, (d) said control circuit acting, whenever the output level of said source is substantially at a predetermined value, to permit said source of alternating current to supply its output, without material modification of the value thereof, to said output terminals via said input terminals, (e) said control circuit acting, whenever the output level of said source is below said predetermined value, to develop an aiding correction for said output and to couple that aiding correction to said output in series-aiding relation, (f) said control circuit acting, whenever the output level of said source is above said predetermined value, to develop a bucking correction for said output and to couple that bucking correction to said output in series-bucking relation, (g) said control circuit including an element that can have a D.C. voltage developed across it.

(h) said control circuit including a subcircuit that can respond to said D.C. voltage across said member to act as a chopper and thereby develop said aiding correction or said bucking correction, (i) said element of said control circuit being a capacitor, (j) said control circuit subcircuit including electronic switches, (k) said subcircuit of said control circuit responding to said D.C. voltage across said capacitor to develop an A.C. voltage and to superimpose that A.C. voltage upon an A.C. voltage from said source of alternating current, (l) said control circuit including a further subcircuit that has further electronic switches, (m) said further electronic switches being capable of becoming conductive at different firing angles, and (n) means responsive to changes in the value of the A.C. supplied to said output terminals to vary the firing angles of said further electronic switches.

22. A regulator for alternating current that comprises:

(a) input terminals that can be connected to a source of alternating current, (b) output terminals that can be connected to an A.C. load, and (c) a control circuit that is coupled between one of said input terminals and one of said output terminals, (d) said control circuit acting, whenever the output level of said source is substantially at a predetermined value, to permit said source of alternating current to supply its output, without material modification of the value thereof, to said output terminals via said input terminals, (e) said control circuit acting, whenever the output level of said source is below said predetermined value, to develop an aiding correction for said output and to couple that aiding correction to said output in series-aiding relation, (f) said control circuit acting, whenever the output level of said source is above said predetermined value, to develop a bucking correction for said output and to couple that bucking correction to said output in series-bucking relation, (g) said control circuit including an element that can have a D.C. voltage developed across it, (h) said control circuit including a subcircuit that can respond to said D.C. voltage across said member to cut as a chopper and thereby develop said aiding correction or said bucking correction, (i) said element of said control circuit being a capacitor, (j) said control circuit subcircuit including electronic switches, (k) an isolating transformer and (l) said control circuit including a second subcircuit that can control the D.C. voltage across said capacitor.

23. A regulator for alternating current that comprises:

(a) input terminals that can be connected to a source of alternating current, (b) output terminals that can be connected to an A.C. load, and
(c) a control circuit that is coupled between one of said input terminals and one of said output terminals,
(d) said control circuit acting, whenever the output level of said source is substantially at a predetermined value, to permit said source of alternating current to supply its output, without material modification of the value thereof, to said output terminals via said input terminals,
(e) said control circuit acting, whenever the output level of said source is below said predetermined value, to develop an aiding correction for said output and to couple that aiding correction to said output in series-aiding relation,
(f) said control circuit acting, whenever the output level of said source is above said predetermined value, to develop a bucking correction for said output and to couple that bucking correction to said output in series-bucking relation,
(g) said control circuit including an element that can have a D.C. voltage developed across it,
(h) said control circuit including a subcircuit that can respond to said D.C. voltage across said member to act as a chopper and thereby develop said aiding correction or said bucking correction,
(i) said element of said control circuit being a capacitor,
(j) said control circuit subcircuit including electronic switches,
(k) means between said capacitor and said source of alternating current adapted to pump energy into said source of alternating current,
(l) said control circuit acting, whenever the A.C. voltage at said output terminals is too high, to cause said means between said capacitor and said source of alternating current to pump energy into said source of alternating current.

24. A regulator for alternating current that comprises:
(a) input terminals that can be connected to a source of alternating current,
(b) output terminals that can be connected to an A.C. load, and
(c) a control circuit that is coupled between one of said input terminals and one of said output terminals,
(d) said control circuit acting, whenever the output level of said source is substantially at a predetermined value, to permit said source of alternating current to supply its output, without material modification of the value thereof, to said output terminals via said input terminals,
(e) said control circuit acting, whenever the output level of said source is below said predetermined value, to develop an aiding correction for said output and to couple that aiding correction to said output in series-aiding relation,
(f) said control circuit acting, whenever the output level of said source is above said predetermined value to develop a bucking correction for said output and to couple that bucking correction to said output in series-bucking relation,
(g) said control circuit including an element that can have a D.C. voltage developed across it,
(h) said control circuit including a subcircuit that can respond to said D.C. voltage across said member to act as a chopper and thereby develop said aiding correction or said bucking correction,
(i) said element of said control circuit being a capacitor,
(j) said control circuit subcircuit including electronic switches,
(k) said control circuit including a second subcircuit,
(l) the first said subcircuit being adapted to pump energy to said capacitor or to pump energy from said capacitor to said output terminals,
(m) said second subcircuit being adapted to pump energy to said capacitor or to pump energy from said capacitor to said source of alternating current.

25. A regulator for alternating current that comprises:
(a) input terminals that can be connected to a source of alternating current,
(b) output terminals that can be connected to an A.C. load, and
(c) a control circuit that is coupled between one of said input terminals and one of said output terminals,
(d) said control circuit acting, whenever the output level of said source is substantially at a predetermined value, to permit said source of alternating current to supply its output, without material modification of the value thereof, to said output terminals via said input terminals,
(e) said control circuit acting, whenever the output level of said source is below said predetermined value, to develop an aiding correction for said output and to couple that aiding correction to said output in series-aiding relation,
(f) said control circuit acting, whenever the output level of said source is above said predetermined value, to develop a bucking correction for said output and to couple that bucking correction to said output in series-bucking relation,
(g) said control circuit including an element that can have a D.C. voltage developed across it,
(h) said control circuit including a subcircuit that can respond to said D.C. voltage across said member to act as a chopper and thereby develop said aiding correction or said bucking correction,
(i) said element of said control circuit being a capacitor,
(j) said control circuit subcircuit including electronic switches,
(k) said control circuit subcircuit providing zero voltage crossovers when it acts as said chopper, and
(l) firing means for said electronic switches of said control circuit subcircuit that cause said zero voltage crossovers to be substantially congruent with the zero crossovers of the alternating current from said source of alternating current.

26. A regulator for alternating current that comprises:
(a) input terminals that can be connected to a source of alternating current,
(b) output terminals that can be connected to an A.C. load, and
(c) a control circuit that is coupled between one of said input terminals and one of said output terminals,
(d) said control circuit acting, whenever the output level of said source is substantially at a predetermined value, to permit said source of alternating current to supply its output, without material modification of the value thereof, to said output terminals via said input terminals,
(e) said control circuit acting, whenever the output level of said source is below said predetermined value, to develop an aiding correction for said output and to couple that aiding correction to said output in series-aiding relation,
(f) said control circuit acting, whenever the output level of said source is above said predetermined value, to develop a bucking correction for said output and to couple that bucking correction to said output in series-bucking relation,
(g) said control circuit including an element that can have a D.C. voltage developed across it,
(h) said control circuit including a subcircuit that can respond to said D.C. voltage across said member to act as a chopper and thereby develop said aiding correction or said bucking correction,
(i) said element of said control circuit being a capacitor,
(j) said control circuit subcircuit including electronic switches, (k) said subcircuit of said control circuit responding to said D.C. voltage across said capacitor to develop an A.C. voltage and to superimpose that A.C. voltage upon an A.C. voltage from said source of alternating current, (l) said subcircuit of said control circuit initiating the superimposition of said developed A.C. voltage onto said A.C. voltage from said source of alternating current at zero degrees and at one hundred and eighty degrees of the alternating current from said source of alternating current.

27. A control system for alternating current that comprises:

(a) input terminals that can be connected to a source of alternating current, (b) output terminals that can be connected to an A.C. load, and (c) a control circuit that is coupled between one of said input terminals and one of said output terminals, (d) said control circuit being adapted to supply A.C. voltage to said output terminal in series-aiding relation and being adapted to supply A.C. voltage to said output terminals in series-bucking relation, (e) energy-storing means that can store energy and that can subsequently supply energy to said control circuit, (f) a subcircuit of said control circuit that connects said energy-storing means to said source of alternating current, (g) said subcircuit of said control circuit having electronic switches that can convert A.C. from said source of alternating current to D.C. and can furnish said D.C. to said energy-storing means and that also can respond to D.C. from said energy-storing means to furnish A.C. to said source of alternating current, and (h) a second subcircuit of said control circuit that connects said energy-storing means to said output terminals, (i) said second subcircuit of said control circuit having electronic switches that can convert A.C. from said source of alternating current to D.C. and can furnish said D.C. to said energy-storing means and that also can respond to D.C. from said energy-storing means to furnish A.C. to said output terminals, (j) said electronic switches of the first said subcircuit of said control circuit being capable of becoming conductive at different firing angles, (k) firing means for said electronic switches of the first said subcircuit of said control circuit that can vary the firing angles of said electronic switches and thereby vary the amount and polarity of the D.C. which the first said subcircuit of said control circuit furnishes to said energy-storing means, and (l) firing means for said electronic switches of said second subcircuit, (m) one of the said D.C. furnished to said energy-storing means being current and the other of the said D.C. furnished to said energy-storing means being voltage.

28. A control system for alternating current that comprises:

(a) input terminals that can be connected to a source of alternating current, (b) output terminals that can be connected to an A.C. load, and (c) a control circuit that is coupled between one of said input terminals and one of said output terminals, (d) said control circuit being adapted to supply A.C. voltage to said output terminals in series-aiding relation and being adapted to supply A.C. voltage to said output terminals in series-bucking relation, (e) energy-storing means that can store energy and that can subsequently supply energy to said control circuit, (f) a subcircuit of said control circuit that connects said energy-storing means to said source of alternating current, (g) said subcircuit of said control circuit having electronic switches that can convert A.C. from said source of alternating current to D.C. and can furnish said D.C. to said energy-storing means and that also can respond to D.C. from said energy-storing means to furnish A.C. to said source of alternating current, and (h) a second subcircuit of said control circuit that connects said energy-storing means to said output terminals, (i) said second subcircuit of said control circuit having electronic switches that can convert A.C. from said source of alternating current to D.C. and can furnish said D.C. to said energy-storing means and that also can respond to D.C. from said energy-storing means to furnish A.C. to said output terminals, (j) said electronic switches of the first said subcircuit of said control circuit being capable of becoming conductive at different firing angles, (k) firing means for said electronic switches of the first said subcircuit of said control circuit that can vary the firing angles of said electronic switches and thereby vary the amount and polarity of the D.C. which the first said subcircuit of said control circuit furnishes to said energy-storing means, and (l) firing means for said electronic switches of said second subcircuit, (m) one of the said D.C. furnished to said energy-storing means being current and the other of the said D.C. furnished to said energy-storing means being voltage, (n) said source of alternating current constituting the only source of energy for said control system and for said A.C. load, (o) said energy-storing means including a capacitor and an inductor.

29. A control system for alternating current that comprises:

(a) input terminals that can be connected to a source of alternating current, (b) output terminals that can be connected to an A.C. load, and (c) a control circuit that is coupled between one of said input terminals and one of said output terminals, (d) said control circuit being adapted to supply A.C. voltage to said output terminals in series-aiding relation and being adapted to supply A.C. voltage to said output terminals in series-bucking relation, (e) energy-storing means that can store energy and that can subsequently supply energy to said control circuit, (f) a subcircuit of said control circuit that connects said energy-storing means to said source of alternating current, (g) said subcircuit of said control circuit having electronic switches that can convert A.C. from said source of alternating current to D.C. and can furnish said D.C. to said energy-storing means and that also can respond to D.C. from said energy-storing means to furnish A.C. to said source of alternating current, and (h) a second subcircuit of said control circuit that connects said energy-storing means to said output terminals, (i) said second subcircuit of said control circuit having electronic switches that can convert A.C. from said source of alternating current to D.C. and can furnish said D.C. to said energy-storing means and that also can respond to D.C. from said energy-storing means to furnish A.C. to said output terminals, (j) said electronic switches of the first said subcircuit of said control circuit being capable of becoming conductive at different firing angles, (k) firing means for said electronic switches of the first said subcircuit of said control circuit that can vary the firing angles of said electronic switches and thereby vary the amount and polarity of the D.C. which the first said subcircuit of said control circuit furnishes to said energy-storing means, and (l) firing means for said electronic switches of said second subcircuit.

(m) one of the said D.C. furnished to said energy-storing means being current and the other of the said D.C. furnished to said energy-storing means being voltage, (n) the first said subcircuit of said control circuit having a portion thereof through which direct current is adapted to flow, (o) said second subcircuit of said control circuit having a portion thereof through which direct current is adapted to flow.

(p) the first said subcircuit of said control circuit being adapted to convert A.C. from said source of alternating current to D.C. and to apply a D.C. voltage to said portions of said subcircuits of said control circuit through which direct current is adapted to flow, (q) said second subcircuit of said control circuit being adapted to convert A.C. from said source of alternating current to D.C. and to force direct current to flow through said portions of said subcircuits of said control circuit through which direct current is adapted to flow.

30. A control system for alternating current that comprises:

(a) input terminals that can be connected to a source of alternating current, (b) output terminals that can be connected to an A.C. load, and (c) a control circuit that is coupled between one of said input terminals and one of said output terminals, (d) said control circuit being adapted to supply A.C. voltage to said output terminals in series-aiding relation and being adapted to supply A.C. voltage to said output terminals in series-bucking relation, (e) energy-storing means that can store energy and that can subsequently supply energy to said control circuit, (f) a subcircuit of said control circuit that connects said energy-storing means to said source of alternating current, (g) said subcircuit of said control circuit having electronic switches that can convert A.C. from said source of alternating current to D.C. and can furnish said D.C. to said energy-storing means and that also can respond to D.C. from said energy-storing means to furnish A.C. to said source of alternating current, and (h) a second subcircuit of said control circuit that connects said energy-storing means to said output terminals, (i) said second subcircuit of said control circuit having electronic switches that can convert A.C. from said source of alternating current to D.C. and can furnish said D.C. to said energy-storing means and that also can respond to D.C. from said energy-storing means to furnish A.C. to said output terminals, (j) said electronic switches of the first said subcircuit of said control circuit being capable of becoming conductive at different firing angles, (k) firing means for said electronic switches of the first said subcircuit of said control circuit that can vary the firing angles of said electronic switches and thereby vary the amount of polarity of the D.C. which the first said subcircuit of said control circuit furnishes to said energy-storing means, and (l) firing means for said electronic switches of said second subcircuit, (m) one of the said D.C. furnished to said energy-storing means being current and the other of the said D.C. furnished to said energy-storing means being voltage, (n) the first said subcircuit of said control circuit being adapted to pump energy from said source of alternating current to said energy-storing means, (o) the first said subcircuit of said control circuit being adapted to pump energy from said energy storing means to said source of alternating current, (p) whereby the first said subcircuit of said control circuit can selectively pump energy into said energy-storing means or into said source of alternating current.

31. A control system for alternating current that comprises:

(a) input terminals that can be connected to a source of alternating current, (b) output terminals that can be connected to an A.C. load, and (c) a control circuit that is coupled between one of said input terminals and one of said output terminals, (d) said control circuit being adapted to supply A.C. voltage to said output terminals in series-aiding relation and being adapted to supply A.C. voltage to said output terminals in series-bucking relation, (e) energy-storing means that can store energy and that can subsequently supply energy to said control circuit, (f) a subcircuit of said control circuit that connects said energy-storing means to said source of alternating current, (g) said subcircuit of said control circuit having electronic switches that can convert A.C. from said source of alternating current to D.C. and can furnish said D.C. to said energy-storing means and that also can respond to D.C. from said energy-storing means to furnish A.C. to said source of alternating current, and (h) a second subcircuit of said control circuit that connects said energy-storing means to said output terminals, (i) said second subcircuit of said control circuit having electronic switches that can convert A.C. from said source of alternating current to D.C. and can furnish said D.C. to said energy-storing means and that also can respond to D.C. from said energy-storing means to furnish A. C. to said output terminals, (j) said electronic switches of the first said subcircuit of said control circuit being capable of becoming conductive at different firing angles, (k) firing means for said electronic switches of the first said subcircuit of said control circuit that can vary the firing angles of said electronic switches and thereby vary the amount and polarity of the D.C. which the first said subcircuit of said control circuit furnishes to said energy-storing means, and (l) firing means for said electronic switches of said second subcircuit, (m) one of the said D.C. furnished to said energy-storing means being current and the other of the said D.C. furnished to said energy-storing means being voltage, (n) the first said subcircuit of said control circuit being adapted to pump energy from said source of alternating current to said energy-storing means, (o) the first said subcircuit of said control circuit being adapted to pump energy from said energy-storing means to said source of alternating current, (p) whereby the first said subcircuit of said control circuit can selectively pump energy into said energy-storing means or into said source of alternating current, (q) said second subcircuit of said control circuit accepting power from said energy-storing means and pumping said energy to said A.C. load, (r) the first said subcircuit of said control circuit pumping energy into said source of alternating current as long as the voltage at said output terminals is appreciably above a predetermined value, (s) said second subcircuit of said control circuit pumping energy to said A.C. load as long as the voltage at said output terminals is appreciably below said predetermined value, (t) whereby said control system can maintain said voltage at said output terminals at said predetermined value.

References Cited by the Examiner

UNITED STATES PATENTS

| | | | |
|---|---|---|---|
| 1,414,652 | 5/1922 | Kirke | 323—45 |
| 1,893,768 | 1/1933 | Fitzgerald | 323—45 |
| 2,562,744 | 7/1951 | Schultz | 323—66 |
| 2,714,188 | 7/1955 | Scherer | 323—66 |
| 2,753,514 | 7/1956 | Muchnick | 323—66 |
| 3,018,431 | 1/1962 | Goldstein | 323—45 |
| 3,032,682 | 5/1962 | Lord | 323—89 |
| 3,075,139 | 1/1963 | Balteau | 323—66 |
| 3,129,380 | 4/1964 | Lichowsky | 323—45 |

JOHN F. COUCH, *Primary Examiner.*

LLOYD McCOLLUM, *Examiner.*

W. E. RAY, *Assistant Examiner.*

UNITED STATES PATENT OFFICE
CERTIFICATE OF CORRECTION

Patent No. 3,281,654                                      October 25, 1966

Owen E. Reinert

It is hereby certified that error appears in the above numbered patent requiring correction and that the said Letters Patent should read as corrected below.

Column 7, lines 67 and 68, strike out "recti- right hand leg of that bridge"; line 68, after "rectifier" insert -- 76 --; same line 68, after "terminal" insert -- 80 to the right-hand terminal --; column 8, line 12, for "in" read -- to --; line 49, after "184," insert -- 196, --; column 10, line 61, after "60" insert a comma; line 63, for "same" read -- some --; line 69, strike out "minal of that secondary winding. The said some" and insert instead -- unijunction transistor 168 "fires"; and thereafter --; column 11, line 47, after "negative" insert -- relative --; column 12, line 42, for "junction" read -- junctions --; column 14, line 17, for "the", first occurrence, read -- that --; line 18, for "righ" read -- right --; column 16, line 48, for "autotransformers" read -- auto-transformer --; line 62, for "$_3$'pump' " read -- "pump" --;

column 17, line 55, for "even-number" read -- even-numbered --; column 21, line 17, for "a" read -- d --; column 22, line 7, after "secondary" insert -- winding --; column 23, line 2, for "capicitor" read -- capacitor --; column 27, line 73, after "230," insert -- the --; column 28, line 57, after "and" insert -- of --; column 29, lines 9, 14 and 17, column 32, lines 28, 29, 32, 35 and 38, column 33, lines 8 and 25, column 34, lines 55 and 72, column 37, lines 71, 73, 74 and 75, column 38, lines 2, 4 and 5 and column 39, lines 6, 14 and 15, for "firing", each occurrence, read -- "firing" --; column 29, lines 35 and 61, and column 37, line 40, for "fire", each occurrence, read -- "fire" --; column 30, line 26, strike out "half-cycle of the alternating current supplied to the ter-" and insert instead -- fier 284 and thereby promptly render those controlled recti- --; column 33, line 57, column 34, line 8, column 35, lines 29 and 54, column 55, lines 32, 37, 73 and 74, column 56, lines 1 and 2, and column 60, lines 10, 13, 16, 69, 72 and 75, for "pump", each occurrence, read -- "pump" --; column 34, line 14 and column 35, line 60, for "pumped", each occurrence, read -- "pumped" --; column 34, line 37, for "revere" read -- reverse --; column 35, line 45, for "termminal" read -- terminal --; column 36, lines 18 and 32, for "fired" read -- "fired" --; line 67, after "terminal" insert -- thereof --; column 37, line 62, for "detaching" read -- detecting --; column 39, line 70, and column 61, lines 5, 7 and 11, for "pumping", each occurrence, read -- "pumping" --; column 40, line 9, for "on" read -- "on" --; line 10, for "off" read -- "off" --; column 41, line 37, for "virable" read -- variable --; column 47, line 16, for "imepdance" read -- impedance --; lines 41 and 42, for "volts seconds", each occurrence, read -- volt-seconds --; column 48, line 59, for "sources" read -- source --; line 63, for "agove" read -- below --; line 64, for "a bucking" read -- an aiding --; column 49, line 17, after "that" insert -- is --; line 31, for "corrction" read -- correction --; column 50, line 38, after "one", second occurrence, insert -- of said --; line 54, for "to" read -- too --; column 52, line 55, and column 53, line 71, for "tht", each occurrence, read -- that --; column 56, line 4, for "a" read -- A --.

Signed and sealed this 11th day of March 1969.

(SEAL)
Attest:

EDWARD M.FLETCHER,JR.
Attesting Officer

EDWARD J. BRENNER
Commissioner of Patents